United States Patent
Selvidge et al.

(10) Patent No.: US 12,517,743 B2
(45) Date of Patent: Jan. 6, 2026

(54) SYSTEM AND METHOD FOR MODELING MEMORY DEVICES WITH LATENCY

(71) Applicant: Siemens Industry Software Inc., Plano, TX (US)

(72) Inventors: Charles W. Selvidge, Oakland, CA (US); Mukesh Gupta, Freemont, CA (US); Sanjay Gupta, Noida (IN); Suresh Krishnamurthy, Noida (IN); Mayank Awasthi, New Delhi (IN)

(73) Assignee: Siemens Industry Software Inc., Plano, TX (US)

( * ) Notice: Subject to any disclaimer, the term of this patent is extended or adjusted under 35 U.S.C. 154(b) by 984 days.

(21) Appl. No.: 17/382,841

(22) Filed: Jul. 22, 2021

(65) Prior Publication Data

US 2022/0066801 A1    Mar. 3, 2022

(30) Foreign Application Priority Data

Aug. 25, 2020   (IN)   ............................. 202041036515

(51) Int. Cl.
   *G06F 9/455*   (2018.01)
(52) U.S. Cl.
   CPC .................... *G06F 9/455* (2013.01)
(58) Field of Classification Search
   CPC ....................................................... G06F 9/455
   USPC ............................................................ 703/24
   See application file for complete search history.

(56) References Cited

U.S. PATENT DOCUMENTS 11,243,856 B1 *   2/2022   Hayashi ................ G06F 30/331

OTHER PUBLICATIONS

Bharat Sukhwani, "ConTutto—A novel FPGA-based Prototyping Platform Enabling Innovation in the Memory Subsystem of a Server Class Processor", Oct. 14-18, 2017 (Year: 2017).*
Shang Li, "Statistical DRAM Modeling", Sep. 30-Oct. 9, 2019 (Year: 2019).*
David Wang, "DRAMsim: A Memory System Simulator", Sep. 2005 (Year: 2005).*
Atsushi Koshiba, "A Software-based NVM Emulator Supporting Read/Write Asymmetric Latencies" (Year: 2019).*
Bharat Sukhwani, "ConTutto—A Novel FPGA-based Prototyping Platform Enabling Innovation in the Memory Subsystem of a Server Class Processor" (Year: 2017).*
David Wang, "DRAMsim: A Memory System Simulator" (Year: 2005).*
Wentao Wang, "Physics-Based Device-Level Power Electronic Circuit Hardware Emulation on FPGA" (Year: 2014).*
Shang Li, "Statistical DRAM Modeling" (Year: 2019).*
Koshiba, Atsushi, et al. "A software-based NVM emulator supporting read/write asymmetric latencies." IEICE Transactions on Information and Systems 102.12 (2019): 2377-2388. (Year: 2019).*

* cited by examiner

*Primary Examiner* — John E Johansen

(57) ABSTRACT

Systems and methods for emulate or prototyping of hardware, such as memory, are disclosed. A memory compiler may receive information, such as system calls, indicative of one or more aspects of latency. Responsive to the information, the memory compiler may create infrastructure, such as pipelines and FIFOs, based on the aspects of latency, for emulation or prototyping of the hardware. Using the created infrastructure may improve emulation compile speed, such as by creating a pipeline-based cache structure, and may improve emulation runtime speed, such as by utilizing earlier unused model clocks to fetch data from host sooner.

19 Claims, 20 Drawing Sheets

```
parameter longint P_DEPTH = (1<<36); parameter P_WIDTH= 32;
bit [P_WIDTH -1 : 0] mem0 [P_DEPTH]; // pragma attribute mem0 lm_type 1 [udata <>]
```
                                                                                    1600

**import fm_latency_model_pkg_vl::*;**

bit t; // Required in pure simulation to make sure that $fm_cmd assign statement is
executed every ddr_clk. always @ (posedge ddr_clk) begin // command initiation/ request
phase
    fm_cmd_type_t action=(mem_cmd == READ) ? eREAD : ((mem_cmd ==WRITE) ?
eWRITE : ((mem_cmd
== PARITY_OR_MODE_REG) ? eUTIL : eNOP));
    t <= $fm_initiate(mem0, action, <RADDR/WADDR signal>, <BL signal>,
        <Latency_signal> <User_data>, MIN_LATENCY);
end fm_cmd_data_t fm_rw, fm_rw_next;
assign fm_rw = $fm_cmd(mem0, t); // command status observer assign fm_rw_next = $fm_peek(mem0, t); // next command status observer always @ (posedgeddr_clk) // command mature phase
    if (fm_rw.cmd == eREAD) begin
        {ra1 , ra0} = *user_rd_burst_idx_fn(fm_rw);* // **user function to handle protocol
intricacies.**
        rdata0 =
        <mem0>[ra0]; rdata1
        = <mem0>[ra1 ];
    end always @ (posedge ddr_clk) // command mature phase
    if (fm_rw.cmd == eWRITE) begin
        {wa1 , wa0} = *user_wr_burst_idx_fn(fm_rw);* // **user function to handle
protocol intricacies.**
        <mem0>[wa0] = wdata0;
        <mem0>[wa1] = wdata1 ;
    End

Always @ (posedge ddr_clk) begin// **optional old and new proposed model checker
phase**
    {ra1_old_model, ra0_old_model} = user_old_rd_burst_idx_fn();
    {wa1_old_model, wa1_old_model} = user_old_wr_burst_idx_fn ();
    $fm_checker(mem0, isREavail_old_model, isWEavail_old_model,
        RE_old_model, WE_old_model,
        ra0_old_model, ra1_old_model ,
        wa0_old_model, wa1_old_model);
end

FIG. 16

SYSTEM AND METHOD FOR MODELING MEMORY DEVICES WITH LATENCY

CROSS-REFERENCE TO RELATED APPLICATION

The present application claims the benefit of priority to India patent application no. 20204103651, titled "SYSTEM AND METHOD FOR MODELING MEMORY DEVICES WITH LATENCY" and filed on Aug. 25, 2020, the entirety of which is incorporated by reference herein.

TECHNICAL FIELD

The present disclosure relates to the field of circuit design verification technology. More specifically, the present disclosure relates to modeling memory devices with latency.

BACKGROUND

Modern integrated circuit designs have become extremely complex. For example, memories, as a key part of modern integrated circuit designs, may be integral in the context of the electronic designs. A variety of memory protocols define the electronic design for access to the memory. Example protocols include, but are not limited to DDR, LPDDR, ONFI, TLC, etc.

Various techniques have been developed to verify that circuit designs will operate as desired before they are implemented in an expensive manufacturing process. For example, logic simulation is a tool used for verifying the logical correctness of a hardware design. Designing hardware today involves writing a program in a hardware description language (HDL). A simulation may be performed by running that program. If the program runs correctly, then one may be reasonably assured that the logic of the design is correct at least for the cases tested in the simulation.

Software-based simulation, however, may be too slow for large complex designs such as SoC (System-on-Chip) designs. The speed of execution of a simulator drops significantly as the design size increases due to cache misses and memory swapping. Emulation and prototyping significantly increase verification productivity by employing reconfigurable hardware modeling devices including emulators and prototyping devices. Field programmable gate arrays (FPGAs)-based emulators and prototyping devices rely on an actual silicon implementation and perform circuit verification generally in parallel, as the circuit design will execute in a real device. For example, hardware modeling systems, such as emulators or FPGA prototypes, may use models of external memory devices (such as DDR memories or flash storage devices). By contrast, a simulator performs circuit verification by executing the hardware description code serially. The different styles of execution can lead to orders of magnitude differences in execution time.

For example, emulators may be used to verify circuit designs. Emulators are specially designed re-configurable hardware devices that can be configured to emulate the behavior of any HDL model via appropriate compile and runtime software. Since memories are an important part of the electronic designs, emulators provide a means to model and implement memories. In general, the emulator has different types of implementation options for memories. On a high level, the modeling method at the user level typically stays the same.

Most of the implementation options are based on memory resources available on the emulator hardware. In general, an emulator may comprise a collection of modeling devices, either FPGAs or special purpose re-configurable chips. These may then be organized into collections called boards which provide a larger reconfigurable unit. The emulator may be mostly built by assembling together a collection of these boards and, depending on the capacity need, the collection may be of different numbers of boards. The emulator may further have special purpose boards (alternatively termed system boards) designed not for realizing user design logic but for providing infrastructure for various needs, such as clocking, cross-connectivity, and additional memory resources.

Various memory implementation options may be used for the emulator. One option comprises on-board memory. As one example, the memories may be distributed as small memories in the modeling devices. As another example, larger memories may be placed on each board or on the system boards. Further, all such memories may be accessed by user-design logic mapped onto modeling devices on the boards. In this regard, the distance from the access point to the actual physical memory is larger if the memory is placed on a board or a system board. As such, memory accesses may be slower for memories placed in the board/system board, impacting emulation performance.

Another option comprises SW-modeled memory with a cache. In particular, memory may be placed on the software side along with maintaining a cache-based implementation in the hardware. An example of this is illustrated in U.S. Pat. No. 9,898,563, incorporated by reference herein in its entirety. This cache-based approach may be effective for implementing medium to large memories since the cache memory on the hardware may be small enough to be modeled as chip memories. From a performance standpoint, one should be mindful of two aspects. First, there is a cost associated with a cache miss. In such a case, the design execution is stopped and a page fetch from the software is executed, which may be costly for performance or throughput. Second, the cache lookup logic structures may be complex, may involve more than one memory access in series in a single cycle of the clock, and may thereby warrant optimization for better emulation clock speeds. This type of implementation may be effective for various QofR parameters (e.g., capacity, performance and throughput) for emulation setups having virtual test-environments where it is acceptable to a execute a page fetch while stalling the design clocks on the emulator when a cache miss occurs.

Still another option is a pure software-based memory solution. In this approach, complete design memory may be maintained on the software side. Further, the hardware side may use standard Verilog/VHDL language-based DPI interface or custom system tasks/functions to access the software side whenever hardware is to perform a read or write operation. One advantage of such an approach is zero hardware memory cost. Another advantage is that such a memory has no hard limit on the number of physical read or write ports. However, one challenge with this approach is significant runtime penalty associated with stalling the emulation design run to fetch data from the software side. This implementation option may be used to model memory storage solutions, such as NAND/NOR-based flash models, where design is to emulate multiple memories in the range of Tera-bytes, and where both on-board and cache-based solutions may incur significant hardware memory cost. The various memory implementation options discussed herein may be realized by automated facilities within the emulation compile system.

Traditionally, memory models may be written using an HDL 2-dimensional or multi-dimensional array structure to represent the memory storage core and then have HDL code around that to implement the glue logic that accesses the core and to provide an external pin level interface to the rest of the design to access the memory. The compile system may select the appropriate underlying memory implementation based on several factors: size of the memory; number of simultaneous read and write accesses to the memory (also known as ports); and requirements to access the memory from the virtual test-bench, and user directives are some of the main factors.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

FIG. 16 illustrates code as an example modeling paradigm.

DETAILED DESCRIPTION

General Considerations

Figure 1A:
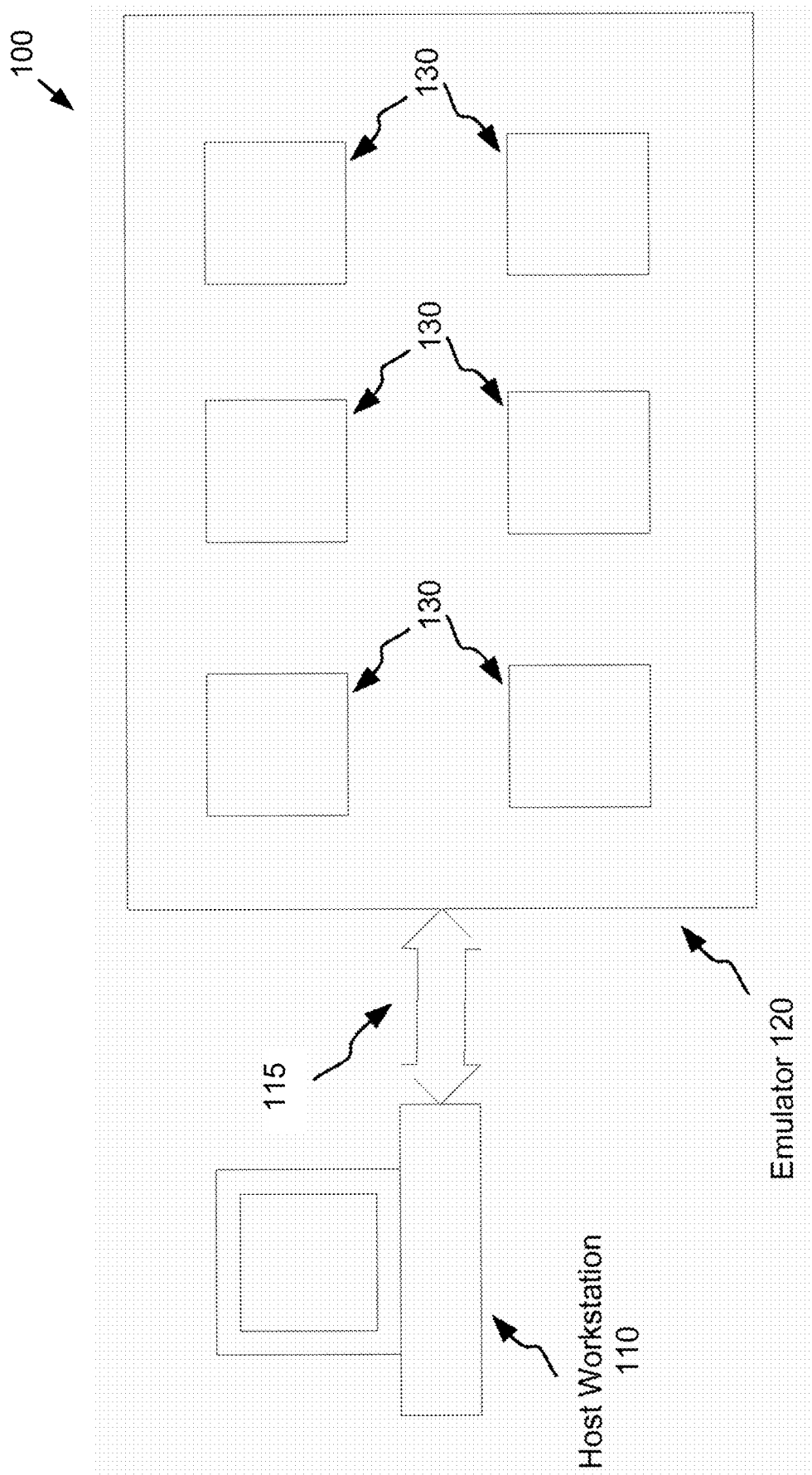
FIG. 1A shows an illustrative example of an emulation system.

Various aspects of the present disclosed technology relate to techniques for modeling memories with latency. In the following description, numerous details are set forth for the purpose of explanation. However, one of ordinary skill in the art will realize that the disclosed technology may be practiced without the use of these specific details. In other instances, well-known features have not been described in detail to avoid obscuring the present disclosed technology.

Some of the techniques described herein may be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

The detailed description of a method or a device sometimes uses terms like "configure" to describe the disclosed method or the device function/structure. Such terms are high-level abstractions. The actual operations or functions/structures that correspond to these terms will vary depending on the particular implementation and are readily discernible by one of ordinary skill in the art.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "perform", "generate," "access," and "determine" to describe the disclosed methods. Such terms are high-level abstractions of the actual operations that are performed. The actual operations that correspond to these terms will vary depending on the particular implementation and are readily discernible by one of ordinary skill in the art.

Illustrative Operating Environment

The programmable logic chips employed by an emulator may be commercial FPGA chips or custom-designed emulation chips containing programmable logic blocks. A custom FPGA-based emulator can have a specially designed internal interconnection network of programmable elements within each custom FPGA, an external interconnecting network and I/O structure of custom FPGAs, and a design-under-test debug engine. Such architecture enables, compared to a commercial FPGA-based counterpart, fast and correct-by-construction compilation and high design visibility in the silicon fabric that assumes 100% access without probe compilation and rapid waveform tracing. A commercial FPGA chip may have somewhat larger capacity density than a custom FPGA chip. For a given design, a custom FPGA-based emulator may need more FPGAs than a commercial FPGA-based emulator, leading to larger physical dimensions and higher power consumption.

The second type of emulators is processor-based: an array of Boolean processors able to share data with one another is employed to map a circuit design, and Boolean operations are scheduled and performed accordingly. Similar to the FPGA-based, the circuit design needs to be partitioned into sub-circuits first so that the code for each sub-circuit fits the instruction memory of a processor. The compilation speed of a processor-based emulator, however, is much faster than those of a FPGA-based emulator. Drawbacks are limited speed of execution in a transaction-based mode, large power consumption, and large physical dimensions compared to a FPGA-based emulator. These types of emulators are merely for illustration purposes. Other emulators are contemplated.

An emulator may operate in various modes. In an in-circuit emulation mode, the emulator is connected with a user's target system to form a prototype of the system the user is designing. The emulator typically replaces the circuit being designed for the target system, allowing system-level and software testing prior to silicon availability. Although an emulator may run up to six orders of magnitude faster than a simulator, it is often not fast enough to run at the same speed of the physical target system (a few megahertz vs hundreds of megahertz). Speed rate adapters may be introduced between the target system and the emulator. A rate adapter behaves like a buffer. It caches the signal activity from the design-under-test (DUT) at emulation speed and sends it at real-time speed to the target system. Conversely, it captures the signal activity from the target system at full speed, caches it, and then sends it back to the DUT at emulation speed. Even when a rate adapter is available, the constant evolution of speed and complexity of individual I/O protocols may make timely rate adapter development difficult.

In an acceleration mode, the physical target system is replaced by a virtual target system modeled via one of the high-level languages such as SystemVerilog, SystemC, or C++. The acceleration mode leverages the existing simulation testbench and removes the need for external rate adapters. The testbench creates test vectors and check corresponding responses of the circuit model. In addition to the elimination of speed adapters, the acceleration mode has advantages such as no hardware dependencies, the ability to use the emulator remotely, and the ability to run verification of corner cases.

The acceleration mode can be cycle-based or transaction-based. The cycle-based acceleration mode employs a signal-level or bit-level interface connecting the testbench processed by the host workstation to the design mode on the emulator. Each and every transition on each and every interface signal must be transferred between the testbench and the design model at the slow speed of the testbench simulated in the workstation. As a result, the speed of the emulator is wasted waiting to carry out these signal transfers.

The transaction-based acceleration reduces the traffic between workstation and emulator by replacing bit-by-bit exchanges with transaction exchanges. Data exchange is through so-called transactors. A transactor, including a front-end proxy interface on the workstation or host computer, a back-end bus-functional model on the emulator and a physical communication channel between the host computer and the emulator, converts high-level commands from the testbench on the host computer into signal-level bit sequences required by the design-under-test model on the emulator, and vice versa. This allows data being streamed and buffered between the testbench and the design-under-test, speeding up the execution of the testbench. A design team can thus access the full performance of the emulator. In addition to performance, the transaction-based emulation eliminates the need for rate adapters. The design-under-test can connect to a "virtual device" (a software model of the device) that runs on the host computer through a transaction-level interface or to a physical device through a transaction-level interface and a "virtual device" acting as a bridging device.

In addition to emulators, reconfigurable hardware modeling devices also include FPGA prototyping devices. FPGA prototyping is typically deployed near the end of the verification process to catch system-level issues. For designs that rely heavily on commercial intellectual property (IP), an FPGA-based prototype is an ideal test platform for ensuring all IP components perform together. An FPGA-based prototype can also serve as a vehicle for software development and validation. Embedded software has become the dominant part of the effort in modern System-on-Chip (SoC) design. FPGA prototyping provides software developers early access to a fully functioning hardware platform well before real silicon. This enables early software development tasks such as operating system (OS) integration and application testing. The increased productivity of software development and validation greatly accelerates a product's time-to-market.

Compared to FPGA-based emulators which typically operate at one to two million cycles per second, FPGA prototypes are designed and built to achieve the highest speed of execution possible, allowing the extension of the speed range into tens of megahertz. The downside to FPGA prototyping is capacity limitations, limited debugging capabilities and long bring-up time. With growing complexity of FPGAs and advancement in both emulation and prototyping technologies, the lines between FPGA-based prototyping and emulation are increasingly blurring.

In some embodiments, the disclosed technology may be implemented as part of a hardware emulation environment, such as the one illustrated in FIG. 1A, which shows an illustrative example of an emulation system 100. As discuss above, emulation and prototyping may be used to verify complex integrated circuit designs. In this regard, any discussion regarding emulation, an emulator, or an emulation system may likewise be applied to prototyping, a prototyper, or a prototyping system. As illustrated in FIG. 1A, the emulation system 100 includes an emulator 120 coupled to a host workstation 110. The host workstation 110 may be implemented by one or more computing systems. One computing system may include a single computer or multiple computers (e.g., a dominant or controlling computer and a plurality of follower computers). The emulator 120 may include multiple printed circuit boards (emulation circuit boards) 130. These emulation circuit boards 130 may be networked (not shown). A circuit design may be partitioned by the host workstation 110 and loaded to the emulation circuit boards 130 for emulation.

Figure 1B:
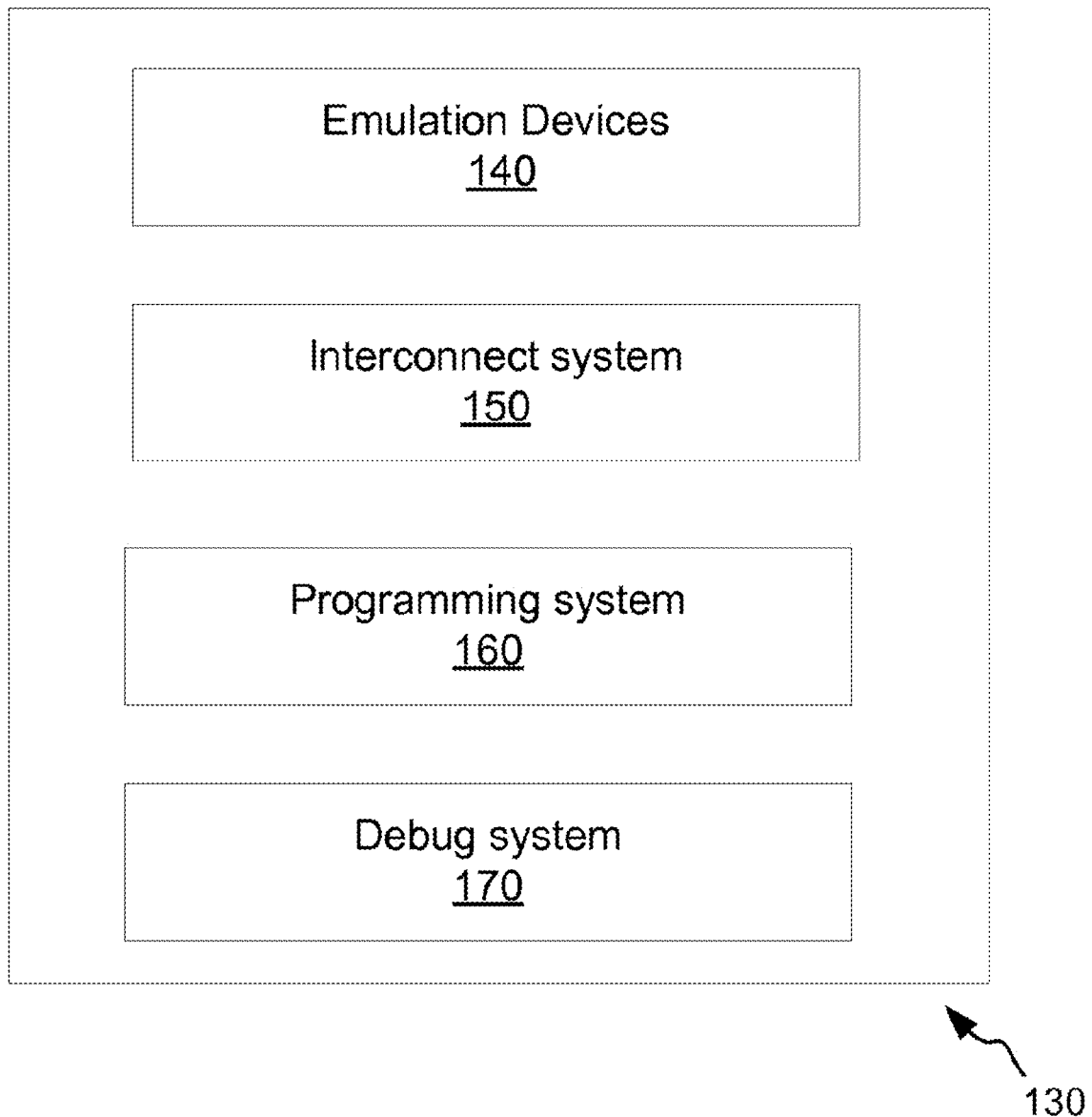
FIG. 1B shows an illustrative example of an emulation circuit board.

FIG. 1B illustrates an example of an emulation circuit board 130. The emulation circuit board 130 includes an array of emulation devices 140. The emulation devices 140 may be programmed to model, for example, combinatorial logic components, sequential circuit components and memories. The emulation devices 140 may be processor-based or FPGA-based.

Figure 1C:
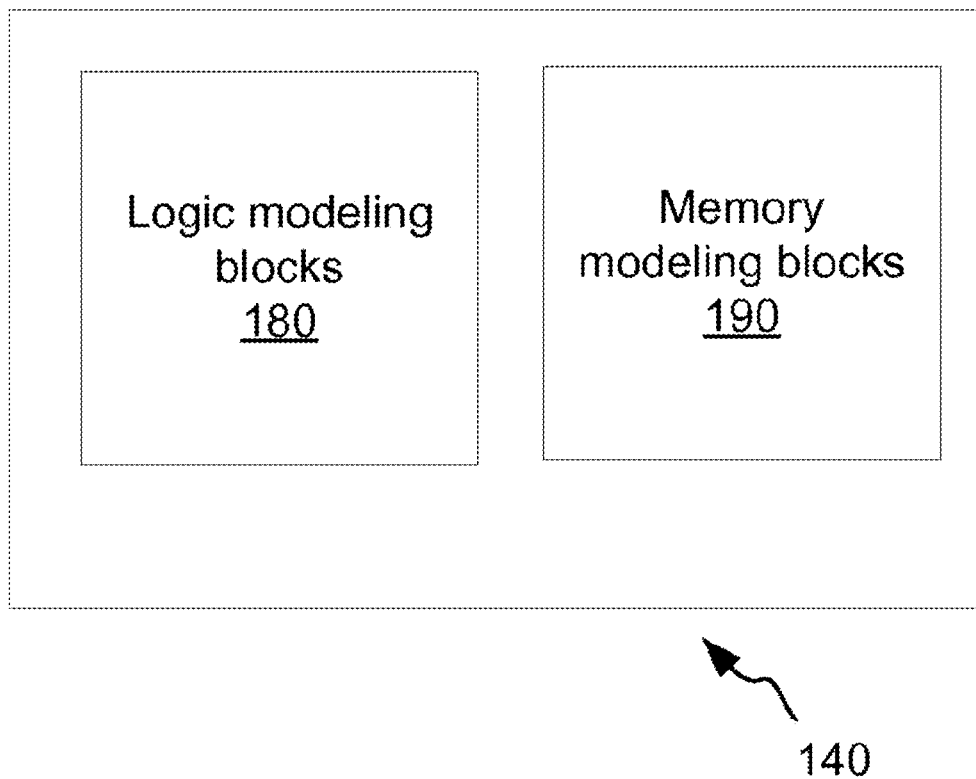
FIG. 1C shows an illustrative example of an emulation device.

FIG. 1C illustrates an example of an emulation device 140. The emulation device 140 includes one or a plurality of logic modeling blocks 180 and one or a plurality of memory modeling blocks 190. The emulation device 140 may also include an interconnect system, a programming system, and a debug system, similar to the emulation circuit board 130. The logic modeling blocks 180 may use FPGAs or Boolean processors to model general combinatorial logic such as AND, OR, XOR, inversion and more complex functions for multiple inputs. The logic modeling blocks 180 may also provide for the modeling of sequential components such as flip-flops and/or latches. The memory modeling blocks 190 provide specific resources for modeling memories in circuit designs. As noted before, memories are used prevalently in modern digital logic designs and although they could be modeled with the combinatorial and sequential components in the logic modeling blocks 180, they can be more efficiently modeled with specific dedicated resources typically containing random-access memory (RAM) blocks and an interface to connect the memory blocks to the logic modeling blocks 180.

The emulation circuit board 130 may further include any one, any combination, or all of an interconnect system 150, a programming system 160, and a debug system 170. The interconnect system 150 allows data to be moved between emulation devices 140. A portion of a circuit design on one emulation device may use data computed by another portion of the design on another emulation device. The programming system 160 enables a variety of other types of data to be brought in or out from an emulation device 140. Examples include programming data to configure an emulation device to perform a particular function, visibility data collected from the debug system 170 to be brought to the host workstation 110 for display, and content data either read from or written to memory circuitry in an emulation device 140. The debug system 170 enables the emulation system to monitor the behavior of a modeled circuit design. Needed data for visibility viewing purposes may be stored in the debug system 170. The debug system 170 may also provide resources for detecting specific conditions occurring in the circuit design. Such condition detection is sometimes referred to as triggering.

The emulator 120 in FIG. 1A is coupled to the host workstation 110 through an interface system 115. The interface system 115 comprises one or more interfaces. A typical interface is optimized to transport large amounts of data such as data containing the emulated circuit design model and initial contents of registers and design memories. This interface may, however, be sub-optimal to transfer smaller sizes of data due to high fixed cost for every transfer. With various implementations of the disclosed technology, the interface system may also comprise one or more interfaces designed for small packets of data and fast streaming speed. The speed may be, for example, in the order of 2-3 Gigabits per second. These interfaces may be employed to synchronize memory images on the workstation and the emulator, as will be discussed in detail below.

Figure 2:
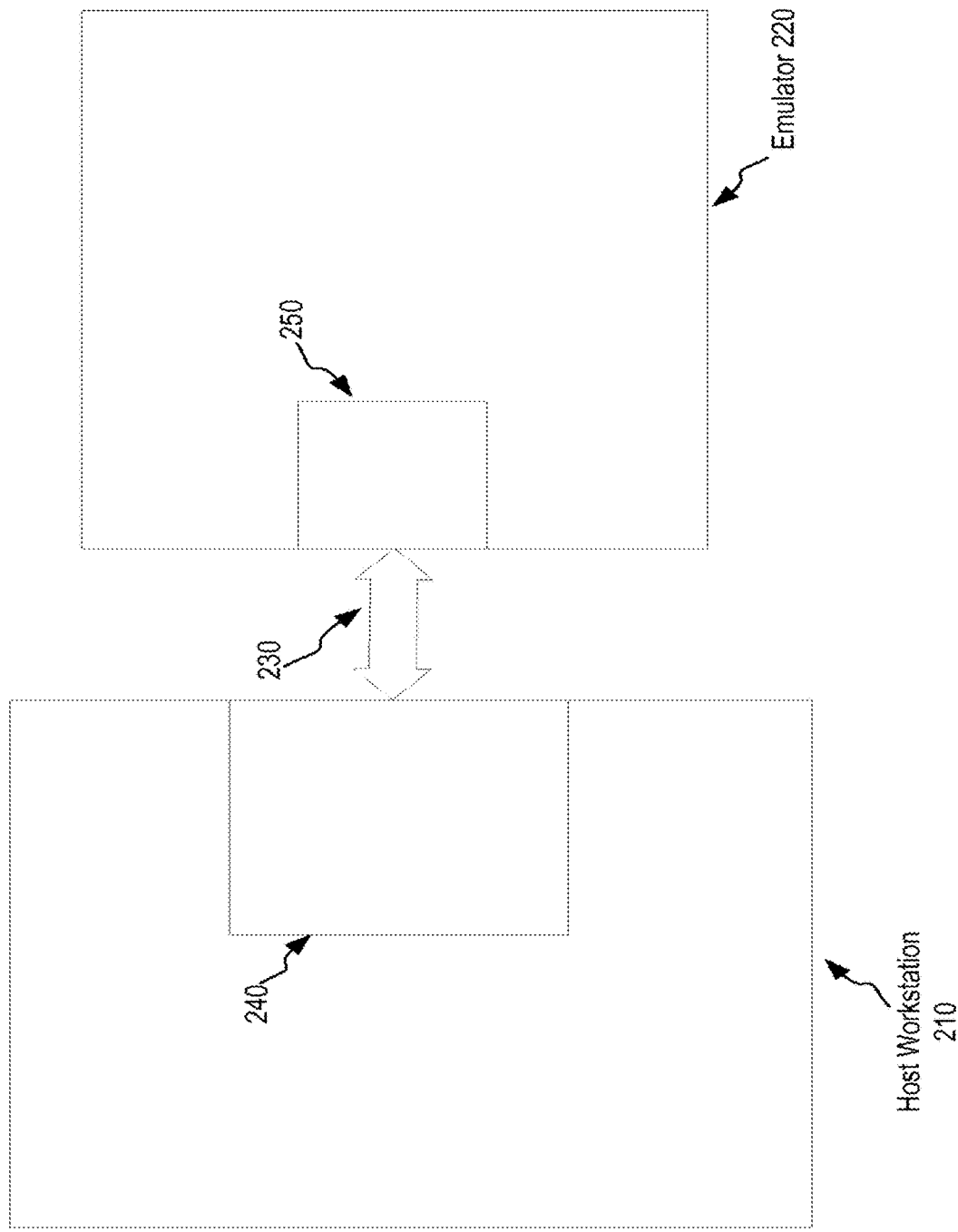
FIG. 2 illustrates an example of memory modeling for an emulation system according to various embodiments of the disclosed technology.

FIG. 2 illustrates an example of memory modeling for an emulation system according to various embodiments of the disclosed technology. The emulation system comprises a workstation 210, an emulator 220, and an interface system 230, similar to the emulation system shown in FIG. 1A. The emulation is configured with an emulation model for a circuit design. The circuit design has access to a memory.

As discussed above, various memory implementation options may be used for the emulator, including, without limitation, on-board memory, cache-based memory, or a pure software-based memory. Merely by way of example, FIG. 2 illustrates the cache-based memory implementation. Other implementations options, including on-board memory or a pure software-based memory, are contemplated.

As illustrated FIG. 2, the memory is modeled with a main memory model 240 in the workstation 210 and a cache memory model 250 in the emulator 220. The cache memory model 250 stores a subset of data that are stored in the main memory model 240. The cache memory model 250 is a hardware model and the main memory model 240 is a software model. These two models are synchronized through an interface in the interface system 230. The interface may be the interface designed for small packets of data and fast streaming speed which is discussed previously.

The main memory model 240 may be a full memory model of the memory and is a complete image of the memory. The main memory model 240 may be a sparse memory model of the memory. As a sparse model, the size of the main memory model 240 grows based on usage. A memory is often divided into pages. The page size may be determined based on applications. The number of pages of the main memory model 240 increases based on usage in a sparse implementation. If all of the pages have been accessed, the main memory model 240 may become a full memory model. The following discussion will use the page-based memory as an example. It should be appreciated that the disclosed technology can be applied to other memory configurations.

The cache memory model 250 is a partial image of the memory. For example, the cache memory model 250 may be less than one percent of the memory. Various conventional caching techniques may be employed by the disclosed technology. If the emulation model of the circuit design needs to read/write a word from/to a page of the memory, the cache memory model 250 is accessed first. If the cache memory model 250 does not have the page containing the address, that page may be retrieved from the main memory model 240 through the interface designed for small packets of data and fast streaming speed. To execute the operation, design clocks may need to be stopped. If the cache memory model 250 is full, a page swap is performed. The page in the cache memory model 250 to be swapped out may be the least recently used page.

Even if the cache memory model 250 stores the page containing the address, the access to the page may not be allowed to execute immediately if the page is "out of date" (or "dirty"). A page is out of date when the content of the page has been changed or is being changed by the workstation. One method to keep track whether a page is up to date or not is to use a bit for each of the pages in the cache memory model 250.

When a page in the cache memory model 250 is changed by a write operation of the emulator model, if it is the first write on that page on the emulator since the page was fetched, a one-way message notifying the workstation side may be sent. This notification will result in marking the workstation copy of the page as "out of date". Again, a one bit per page information may be kept, for example, to manage this information on the workstation side. Beyond this point, any emulator side writes to the same page can be done normally. If and when, the workstation side user model gets an opportunity to access (read or write) the same page of the main memory model 240, the cache infrastructure will fetch the contents of that page from the emulator, update its own copy, reset the workstation out of date bit, and then it will proceed with the access operation. If the access operation is a write operation, then the emulator side out-of-date bit for that page will also be set. Note that, the emulator sends the notification bit for an emulator write when it finds that the out-of-date bit for that page in the workstation isn't set. This may be when a first emulator write is occurring after the page was fetched. It may also be the first write after the workstation updated its copy of the page due to one or more workstation side read operations on that page.

Alternatively, when a page in the cache memory model 250 is changed by a write operation of the emulation model, a one-way message carrying the write information may be sent immediately to the workstation via the interface designed for small packets of data and fast streaming speed. Accordingly, pages of the main memory model 240 cannot be out of date. The cache memory model 250 may still employ status bits. When a page of the main memory model 240 is changed by a write operation, the corresponding status bit for the page of the cache memory model 250 will be changed to indicate the page as "out of date". If and when, the logic on the emulator gets an opportunity to access (read or write) that page, the cache infrastructure will fetch the contents of that page from the workstation.

Illustrative Computer-Based Operating Environment

Figure 3:
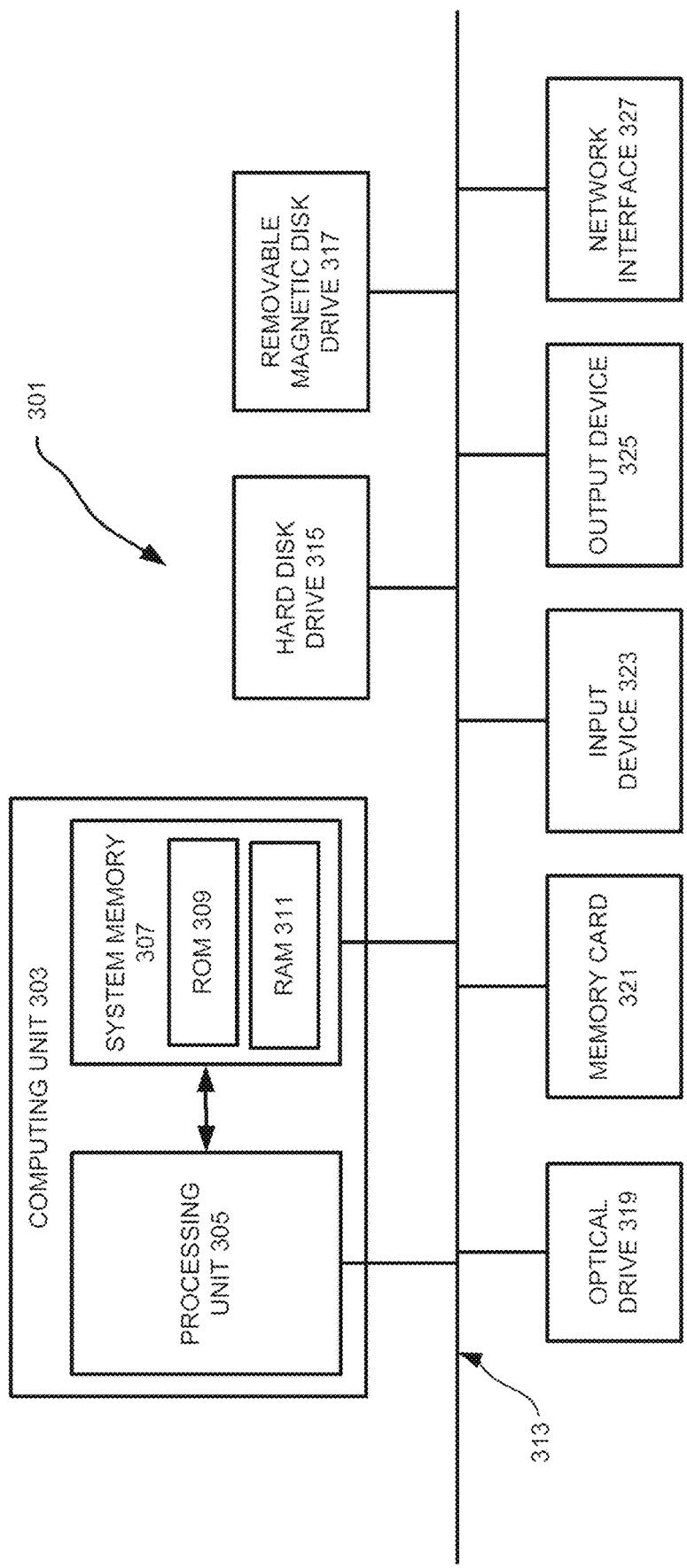
FIG. 3 illustrates a programmable computer system with which various embodiments of the disclosed technology may be employed.

FIG. 3 shows an illustrative example of a computing device 301 which may serve as the workstation 110 and/or implement various embodiments of a part or whole of the disclosed technology. As seen in this figure, the computing device 301 includes a computing unit 303 with a processing unit 305 and a system memory 307. The processing unit 305 may be any type of programmable electronic device for executing software instructions, but will conventionally be a microprocessor. The system memory 307 may include both a read-only memory (ROM) 309 and a random access memory (RAM) 311. As will be appreciated by those of ordinary skill in the art, both the read-only memory (ROM) 309 and the random access memory (RAM) 311 may store software instructions for execution by the processing unit 305.

The processing unit 305 and the system memory 307 are connected, either directly or indirectly, through a bus 313 or alternate communication structure, to one or more peripheral devices. For example, the processing unit 305 or the system memory 307 may be directly or indirectly connected to one or more additional memory storage devices, such as a :hard" magnetic disk drive 315, a removable magnetic disk drive 317, an optical disk drive 319, or a flash memory card 321. The processing unit 305 and the system memory 307 also may be directly or indirectly connected to one or more input devices 323 and one or more output devices 325. The input devices 323 may include, for example, a keyboard, a pointing device (such as a mouse, touchpad, stylus, trackball, or joystick), a scanner, a camera, and a microphone. The output devices 325 may include, for example, a monitor display, a printer and speakers. With various examples of the computing device 301, one or more of the peripheral devices 315-325 may be internally housed with the computing unit 303. Alternately, one or more of the peripheral devices 315-325 may be external to the housing for the computing unit 103 and connected to the bus 313 through, for example, a Universal Serial Bus (USB) connection.

With some implementations, the computing unit 303 may be directly or indirectly connected to one or more network interfaces 327 for communicating with other devices making up a network. The network interface 327 translates data and control signals from the computing unit 303 into network messages according to one or more communication protocols, such as the transmission control protocol (TCP) and the Internet protocol (IP). Also, the interface 327 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 301 is illustrated as an example only, and it not intended to be limiting. Various embodiments of the disclosed technology may be implemented using one or more computing devices that include the components of the computing device 301 illustrated in FIG. 3, which include only a subset of the components illustrated in FIG. 3, or which include an alternate combination of components, including components that are not shown in FIG. 3. For example, various embodiments of the disclosed technology may be implemented using a multi-processor computer, a plurality of single and/or multiprocessor computers arranged into a network, or some combination of both.

Modeling Latency

As discussed in the background, memory models may be written to represent the memory storage core and then generate HDL code to implement the glue logic that accesses the core. Thus, the accesses to this memory storage core by the glue logic have an immediate semantic, implying that the compiler-created infrastructure that fulfills the access requests has only one cycle of the clock to obtain the necessary information to serve that request.

Further, the memory models for many of the prevalent memory protocols are fairly involved and developed as solutions by dedicated engineering teams to be used by end users of emulation directly. These developments utilize the memory compiler's capabilities to compile the memories in an optimal way. The bulk of the work for these developments is correctly writing the glue logic in a protocol-specific way. Of note, the memory model writers must be cognizant of the underlying memory implementation limitations at least in terms of the number of simultaneous ports allowed. This is especially important for memories that are large enough to require the board/system boards memories since those are usually less flexible in terms of allowed number of ports (e.g., typically the number of ports is limited to 2 or only 1 port (read and write)). Thus, memory model writers must manually write the glue logic, requiring knowledge of the distinct model source code for the different platforms.

In SOC design, memory models also provide a communication fabric between CPUs and GPUs, or between CPU/GPU and peripheral devices. With ever-increasing SOC and associated software validation complexity, hybrid software-hardware environments are developed both in-house and by EDA vendors. Such a hybrid environment may have an operating system running on a virtual software-based CPU model, and a hardware-based GPU model seamlessly communicating with each other via system memory. Such a system memory coexists in both software and hardware, provides simultaneous access to both sides and intelligently synchronizes memory accesses from both the sides. Further, a reasonable runtime performance is a key functional metric. In this regard, it is beneficial for memory models to emulate low-level complex hardware memory interleaving strategies, be able to provide seamless software access at a higher abstraction level, and have the capability to report and diagnose data integrity issues.

Moreover, the memory model developments may target multiple hardware platforms. For even the same emulator platform, there may be more than one generation of the emulator for which the same memory model needs to work. In particular, a single hardware platform may have multiple storage modeling means. Memory model source code targeting two or more different underlying storage technologies either uses a compromise non-optimal code which can target either, or is specifically tuned and optimized, resulting in distinct code for the different underlying storage media. Also, emulation vendors may support prototyping as a continuum of emulation so that the same memory models should work on prototyping with zero/minimal adjustments. Towards this end, the memory models may be designed as target agnostic as much as possible.

Although there are a variety of different protocols based on the application need and the final implementation architecture, there are common elements/concepts in such interfaces that may be used for a variety of different protocols. For example, most protocols have a request-response protocol at the memory interface for accessing the memory contents. In addition, there may be a protocol-specified allowed interval between the request and the response known as latency.

Thus, hardware modeling systems have complex behavior involving a protocol for conveying requests and serving these requests later, after expiration of some programmable latency, based on underlying data maintained in an internal storage model. Creation of such models necessitates development of a hardware model to implement the request protocol, to implement programmable latency and to use platform-specific memory model primitives to provide internal storage. Performance optimal implementations may vary for distinct platforms and may also vary with the use of different variations of internal storage modeling resources. In this regard, implementing latency at the compilation level (and thus at a more abstract level than done previously) may assist in creating optimized models (such as across one or more hardware platforms and storage media).

In one or some embodiments, the memory compiler (interchangeably termed emulation compiler, emulation memory compiler, prototyping compiler, or prototyping memory compiler) is configured to model one or more aspects of latency. In particular, the memory compiler is configured to provide a memory modeling interface that models one or more aspects of latency (e.g., minimum and/or variable latency). Further, the memory compiler may tailor the modeling of latency based on one or both of: the specific protocol; or the memory implementation options.

In particular, in one or some embodiments, the memory compiler may be tailored to one or more protocols in order to model latency. As one example, a protocol may use a request-response based access, so that the memory compiler may model latency between request and response. In particular, a request interface for memory access may specify one, some, or all of the following: access type; access size; and access latency. Access type may comprise any one, any combination, or all of: read; write; burst read; and burst write. Access size may comprise a size indicator, such as a number of memory locations to access. Access latency may comprise a time indicator, such as time at which the response is expected. Time may be measured in one of several ways, such as in a number of clock cycles. Further, a response interface may be configured to receive a request-completion and proceed with the actual memory access. In particular, the response interface may return one, some, or all of the specifications performed during request, such as any one, any combination, or all of: access type (e.g., read or write); start address; or access size (e.g., burst length).

Tailoring the memory compiler to the protocols may assist in one of several ways. As one example, the tailoring may allow the final access of the memory to be written by the memory model writer. This may be beneficial since, depending on the specific memory protocol, the final access may access the whole word or a part of the word and also may change for different requests even for the same protocol based on how the request was formed. In this way, the final access may be left to the memory model. Thus, the memory model generated by the memory compiler may be tailored for use with different memory protocols.

Alternatively, or in addition, the memory compiler may be tailored to model latency for different memory implementation options. As one example, if the memory is implemented in software with a cache memory in hardware, the compiler may take advantage of or account for the latency in a few ways. For example, the compiler may receive information regarding at least one aspect of latency, and generate infrastructure regarding the at least one aspect of latency (e.g., creating pipelines and/or FIFOs in order to improve operation of the model). The information regarding the at least one aspect of latency may comprise one or more system calls, program directives (e.g., pragmas), or other inputs to the compiler. For example, based on the one or more system calls, the compiler knows the minimum latency available. Therefore, the memory compiler may insert additional pipelines into the cache lookup/management logic at appropriate places to break and optimize single cycle path lengths. This assists in the overall emulation clock speed since now the cache logic path lengths are smaller and may no longer be critical to the clock speed. Dynamically, the latency may actually be larger, on average, than the minimum latency. As illustrated in more detail in FIG. 10, the cache-miss handling infrastructure may be enhanced to ensure that any page fetches resulting from a cache miss are started as soon as the memory access request is received. In this way, the page fetch from the software is executing in parallel to the latency cycles after which the actual memory access will occur. Thus, the design clocks need not be stopped until the latency cycles are completed. Specifically, if the page fetch has completed, there is no need to stop the design clocks. Alternatively, if the page fetch is still pending, design clocks are stopped, as discussed further below. Further, even if the design clocks are stopped, in the present implementation, the design clocks are stopped for a lesser number of cycles than was performed in previous solutions, improving performance.

Further, if the memory is implemented completely in hardware, the minimum latency information may still be used to place one or more structures, such as pipelines, to reduce the emulation clock speed constraints caused by logic-paths scheduled to access the physical memory. Also, the port handling may be more seamless since the memory compiler is aware of the protocol-level access requirements and may choose an appropriate memory shape (e.g., word size versus depth) to ensure the feasibility of the implementation based on the number of available ports for that implementation of the memory.

If the memory is implemented completely in software, the latency information may be used to fetch data sooner from software model without the need to stall the emulation run for longer duration. This may provide significant performance boost for memory storage solutions that model memories to the tune of Tera-bytes. For hybrid memory-models, latency information may be used to provide early synchronization with significant performance boost. This is especially important when complex interleaved hardware memory models are created, and data transfer to software requires multiple memory access over different address ranges.

Thus, the memory compiler may model latency in one of several ways, such as by using one or both of commands (such as system calls) or structures to implement latency in the model. For example, the memory compiler may model latency through one or more latency commands, such as latency system tasks or latency PLI calls that are added as a latency modeling subset for existing memory model writers. In this way, the functionality of latency in the memory compiler may be added to an existing memory compiler (such as in the form of new system tasks or new PLI calls).

As merely one example, the memory compiler may include one or more calls to perform a specified task, such as the capability to specify fixed parameters that do not change during emulation test runs. In one or some embodiments, the call may include both one or more non-latency parameters and one or more latency parameters. In particular, the call may include one or more structural properties of the memory (e.g., any one, any combination, or all of: word size; depth; number of simultaneous reads/write ports; etc.) and one or more properties directed to latency (e.g., one or both of: minimum latency between memory access request and response; or indication of variable latency). Alternatively, the memory compiler may model latency through an entirely new set of system calls which include only properties directed to latency.

Structurally, the memory compiler may utilize specified latency via one or both of: (i) pipeline flops, which may be inserted in memory implementation based on minimum latency; or (ii) overlapped time advance with access requests to memory implemented in software thereby delaying stalling of the design clocks until expiration of dynamic request-specific latency.

In addition, the memory compiler may enable examining responses, such as in a current cycle, or in an upcoming cycle. In one or some embodiments, a first system call may provide information about a current request in progress, and a second system call may provide information about an upcoming request in an upcoming cycle (e.g., a next request in the queue following just behind the current request in progress). For example, if the current request lasts several cycles (such as in case of a burst access), the second system call may still provide information about the next request in queue so the look-ahead is more than 1 clock cycle.

In this regard, the memory-compiled infrastructure may learn about a memory access request more than one cycle prior, which is in contrast to typical memory compilers. Specifically, even though the memory protocols themselves may include a common latency element in their memory access schemes, a typical memory compiler's view of the memory core access is cycle accurate. This essentially means that although a request of a memory access (with the target address location) is known within the glue logic of the memory model several cycles before the actual access, the memory-compiled infrastructure learns about it with only one cycle prior notification. As discussed above, for all of the possible implementations of the memory, the one cycle scheduling constraint is an important factor in determining the resulting performance. In this regard, enabling the memory compiler to obtain information about the latency in a form that the memory compiler may then use in the compiled infrastructure may result in optimizations/simplifications therein.

Further, the interface may be modeled based on sequential (e.g., procedural) calls at the register-transfer level of modeling. For example, with regard to the system task or PLI-based modeling interface, modeling interfaces may comprise pin interfaces with a specified handshake protocol to exchange information. The procedural interfaces may thus allow writing of the model as a sequential model (e.g., at RTL level) and where the modeling interface executes within a single clock cycle for a given call.

Moreover, various interfaces are contemplated. As one example, a PLI interface may be used to provide a procedural modeling semantic to one or more new interfaces. The procedural modeling context ensures that any local processing of the input arguments to be sent into the PLI calls may be computed before the call automatically. Alternatively, a pin interface into a predefined macro may be used. However, it is noted that a pin interface expects such computations to have been performed a cycle earlier and also, requires its own handshake protocol for transferring the values into the pin interface. This type of modeling paradigm may be inconvenient since careful thought has to be given to avoid additional cycles in the model.

As discussed above, the modeling interface may be applied to one or more the memory implementation options for the emulator. For example, the modeling interface may be applied to any one, any combination, or all of the following implementations of the memory: (i) on-board memory (e.g., memory entirely in the emulator with different types hardware-based implementations); (ii) cache-based memory (e.g., memory mostly in software with a cache in the emulator); or (iii) pure software-based memory solution (e.g., memory entirely in software). In addition, in one or some embodiments, the memory implementation may be shaped differently (e.g., word-size x depth) than the original memory (for ease of implementation).

Thus, the memory compiler may be used to model for a variety of memory applications. One example application comprises a hybrid use of the memory where the system-level models exist both on the software (e.g., the workstation) and on the emulator. In such an application, the model may be implemented such that the software and the emulator may both access the memory. Another example application comprises a storage application.

The memory compiler flexibility discussed above enables re-usability of the memory models across different generations of emulation platforms or across emulation and prototyping platforms. As mentioned above, the memory model writer accounts for important parameters of the underlying memory implementation, such as the number of allowed ports for a feasible implementation. Unfortunately, this property may change from one generation of emulation platform to another, or transitioning from emulation to prototyping platforms. As merely one example, the need for simultaneous ports is not necessarily a true need, but results from the way the actual memory is mapped onto the emulation memory. Specifically, there may be a modeling advantage and/or an ease in laying out the memory in a way that a single actual wide word is split into two words when it is mapped into the emulation memory. This then leads to reads comprising two consecutive words from the emulation memory for a single actual access. There may also be a need to implement a double data rate of memory accesses for DDR protocols, which may also lead the memory model to have simultaneous accesses to the memory. The challenge for the memory model writer is to re-adjust their model for varying underlying platform port limitations and support them seamlessly. Further, in this case, if the emulation compile infrastructure is aware of the higher level requirements of the protocol in terms of access width and data rate, it may then make an informed decision as to mapping the memory into the relevant implementation depending on its underlying implementation parameters, and may take advantage of this information to map the memory more optimally. As one example, responsive to the compiler knowing that what previously appeared as two independent accesses is actually related and has consecutive addresses, the compiler may limit the infrastructure complexity to meet that need and not build generic infrastructure for completely random accesses.

Thus, in one or some embodiments, the memory compiler, with awareness of the high-level memory protocols and/or hybrid systems, has several advantages. As discussed above, there are some common interfacing elements in different memory protocols, as well as differences in low-level details of those elements so that not all protocols are exactly the same. The disclosed memory compiler is configured to be sufficiently generic to support a variety of different protocols. Further, the request-response interfaces generated by the memory compiler may implement a FIFO-like logic structure in the memory glue logic, in order to track requests and thereafter deliver the responses when the request has matured. Specifically, because this latency intelligence is at the memory compiler level, the FIFO generated by the memory compiler is implemented automatically as emulation infrastructure and the memory model glue logic is still able to access relevant information about the request progress from that without having to maintain its own FIFO logic/states. This is in contrast to previous solutions in which attempts to make the emulation compile infrastructure aware of these latencies without actually changing the existing glue logic necessarily resulted in the drawback that this FIFO-like structure must be implemented in two places: in the memory model as well as the emulation infrastructure compile.

Figure 4:
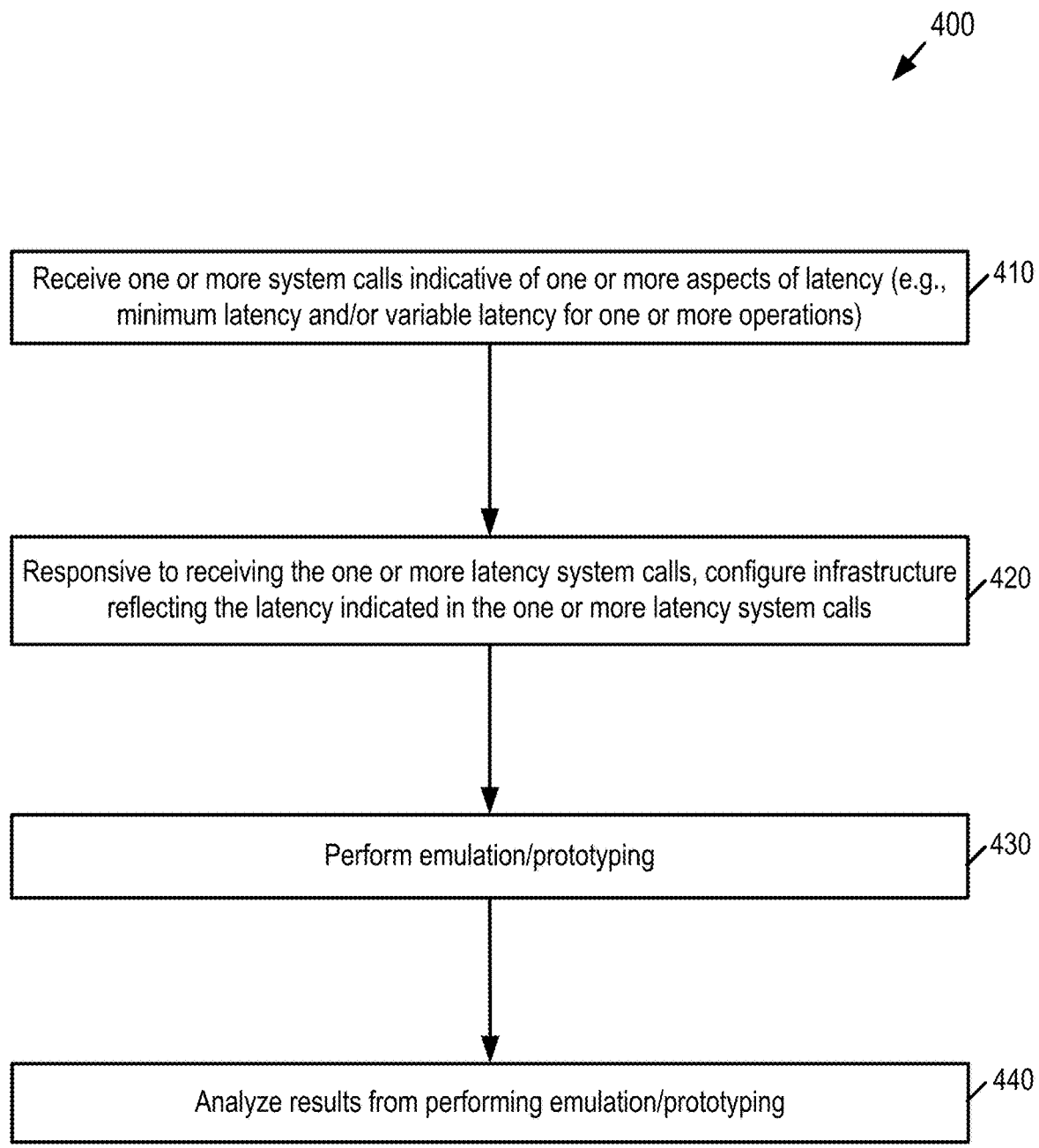
FIG. 4 is a first flow chart for using a memory compiler to model latency.

FIG. 4 is a first flow chart 400 for using a memory compiler to model latency. At 410, the memory compiler receives one or more system calls indicative of one or more aspects of latency (e.g., minimum latency and/or variable latency for one or more operations). At 420, responsive to receiving the one or more system calls, the memory compiler configures infrastructure (e.g., generates the memory model) reflecting the latency indicated in the one or more system calls. At 430, emulation and/or prototyping is performed. At 440, the results from performing emulation and/or prototyping are analyzed.

As discussed above, there are various ways to implement compiler commands indicative of latency, such as latency directed system tasks or PLI calls. In one or some embodiments, the system calls directed to one or more aspects of latency may be added as a modeling subset for the memory model writers. In this regard, some system calls may be directed to latency whereas other system calls are not. Each such latency PLI function may be available to be used with each memory model. In particular, PLI comprises a mechanism to implement what are known as system calls and written by naming a function with $ as the prefix, where the actual definition of the function is provided as a C function.

For example, the memory core declaration and the actual read/write modeling may be preserved. This is performed so as to keep the models as close to the existing ones to avoid unnecessary code changes and re-writing. Also, this part of the model has no fundamental change. The only additional information to be specified with these declarations is the aspect of latency (e.g., how much minimum cycle latency is expected in the accesses made to this memory). This may be used by the memory compiler to decide the infrastructure to configure (e.g., the number of pipeline flops to safely insert in the infrastructure in the context of minimum latency).

As discussed above, various protocols are contemplated, such as a request-response protocol. In such a protocol, one purpose of these system calls is to provide both a request call (e.g., $fm_initiate) and then a response call (e.g., $fm_cmd). The request call may identify at least one aspect regarding latency, and one or more aspects regarding the request. As one example, the request call may include any one, any combination, or all of: the memory core declaration identifier; the cycle latency after which the access needs to take place; the type of access (e.g., read, write, burst read, burst write); and the address range to be accessed. Responsive to receiving the request call, the memory compiler may create infrastructure. As one example, the memory compiler may create the FIFO infrastructure to perform such requests and their details and when the right number of latency cycles have passed, the request is matured. In particular, the FIFO infrastructure may be created to be able to deliver responses at varying times, with each request containing the appropriate time so that the delivery action performed by the created FIFO infrastructure is performed at the appropriate time. This information may then be returned to the memory model via the $fm_cmd( ) PLI call, which is another PLI call provided. Further, this call may also receive the memory core identifier.

In one or some embodiments, the user memory model may perform the $fm_cmd call one, some, or every cycle and monitor the outputs generated. For example, the $fm_cmd is configured to output one or more details of the request that has matured at the proper time. Specifically, the user model may make a direct access to the memory core to complete the access. Thus, in effect, the latency infrastructure, such as the FIFO infrastructure, honors the request latency and further carries the request information until the latency time is completed. Moreover, via the disclosed methodology, the latency infrastructure is moved into the emulation-compiled memory infrastructure. At the same time, the progress of the request may be tracked by the user model at all times so it need not create the infrastructure itself.

Thus, a command, such as $fm_cmd( ), provides a response for the current cycle. Alternatively, or in addition, a command may provide a response for a future cycle, such as a next cycle. In this way, the user model may perform a look-ahead response access for the next cycle along with the response for the current cycle (via $fm_cmd( )). To perform the future cycle response (such as the next cycle response), a look-ahead peek call ($fm_peek( )) may be used. The look-ahead peek call may thus provide the same information as the response for the current cycle (via $fm_cmd( )), but for a future cycle, such as a next cycle. While $fm_peek may provide information about the type (e.g., read vs write), the address, or width of an upcoming call, it may not typically enable providing early access to the data to be returned by a read request. This is to avoid providing a means in which to return read data before its latency has expired, which may effectively eliminate the ability to utilize this corresponding portion of latency for performance improvement.

Figure 5:
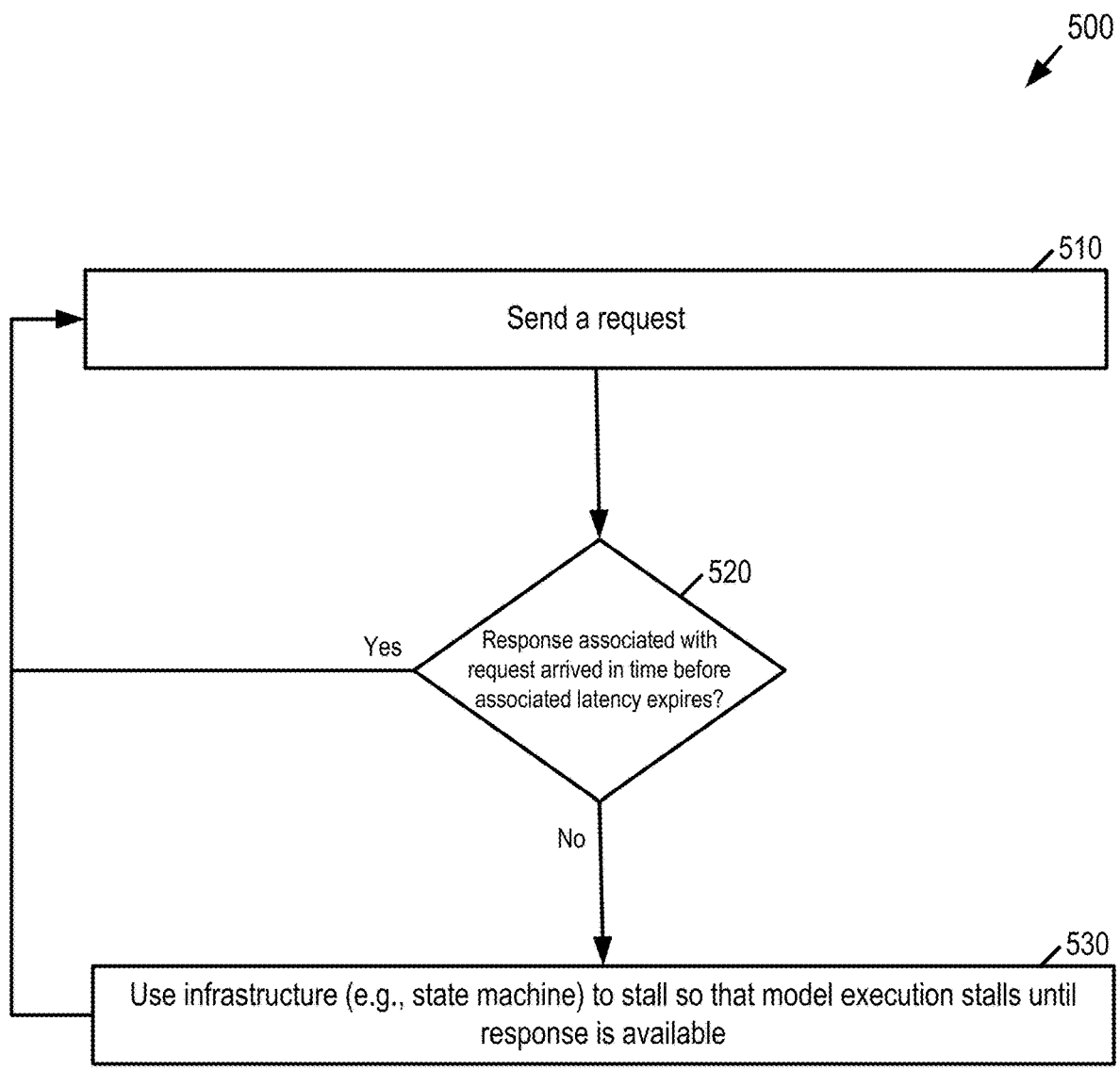
FIG. 5 is a second flow chart for modeling latency.

FIG. 5 is a flow chart 500 of another example for modeling at least one aspect of latency. As discussed above, various aspects of latency may be modeled, such as minimum latency and/or variable latency. With regard to variable latency, there may be instances where the latency in the memory model may be variable. As merely one example, in the context of a cache-based implementation, a cache-miss (resulting in a seeking data from an alternate memory) results in variable latency. Various infrastructure are contemplated to model variable latency in the memory model.

As one example, a state machine (such as a FIFO) may be used to model the variable latency, such as being responsible for tracking dynamic latency associated with a request and also to influence one or more attendant actions. In the cache-based implementation, if the response associated with a request, such as a fetch-page request, sent to software does not return in time before the associated latency expires, the state-machine may perform one or more action, such as initiate stalls in the system so that the model execution stalls until the fetch response is available. As such, at 510, a request is sent. At 520, it is determined whether the response to the request arrived in time before the associated latency expires. If yes, flow chart 500 loops back to 510. If not, at 530, infrastructure, such as a state machine, is used to stall so that model execution stalls until response is available.

Thus, in one or some embodiments, an abstract memory modeling system is disclosed that includes a memory modeling API, corresponding memory compilation software to target a collection of underlying one or more hardware platforms and storage media, and corresponding modeling structures on one, some, or each type of hardware platform which is targeted by the memory compiler. Use of the modeling API with a command request and then delayed action response subject to a minimum delay enables: (1) raising the modeling source level of abstraction, aligning more closely with memory devices that have a request-delayed response protocol and simplifies modeling effort by encapsulating a common structure which otherwise needs to be explicitly created in a manual model; and (2) identifying minimum latency which may then be used to pipeline corresponding synthesized hardware structures for optimality. Further, use of the memory compiler to synthesize the abstract source to specific hardware structures enables generation of a platform-specific or storage-media-specific implementation from a common source. This allows a single source representation to give optimal results across these dimensions without requiring source-level optimizations for each backend variation. Also, including optimization into a compile tool allows the result of source code to be refined or optimized over time through compiler changes without corresponding source code changes. In this way, models may be improved without changing their source code as new techniques are identified and included into the memory compiler.

As discussed above, latency may comprise minimum latency and variable latency. Minimum latency is present regardless whereas variable latency is present under certain circumstances, such as due to a cache miss. In implementing such latency in the model, the model may comprise a minimum latency (which may be manifested by one or more pipeline flops) and a model variable latency (which may be manifested by one or more FIFOs). In one or some embodiments, the allocation of minimum latency and variable latency for the model may be in a performance optimal way. In particular, in one or some embodiments, the compiled infrastructure for the model may include pipelines to create a minimum latency implementation with a latency less than the model minimum latency and with the fastest clock speed, with part or all of the additional latency (e.g., which may comprise the remaining part of the minimum latency plus some or all of the variable latency) may be allocated to overlap variable latency with the compiled implementation to the extent it has a variable latency. In this regard, an amount of minimum latency is allocated towards pipelines, which create compiled implementation minimum latency, and some or all of the remaining minimum latency and some or all of the variable latency is allocated toward mechanisms in the compiled implementation which overlap whatever implementation variable latency with allowed variable latency associated with the model on a particular request.

Alternatively, the compiled infrastructure for the model may include pipelines to create a minimum latency implementation, e.g., with a latency equal to or greater than the model minimum latency. For example, in certain circumstances, such as when the likelihood of a minimum latency request is low and the likelihood of a request to have a latency well above the minimum latency is high, the pipelines manifesting the minimum latency may exceed the model minimum latency to improve performance under these certain circumstances. Further, operations, other than memory operations, may occur. As such, improving or optimizing performance may account for all operations, and not simply memory operations. As such, even though stalls may occur when the pipelines are created with a latency equal to or greater than the model minimum latency, the pipelines may improve the overall operation, with the increase in clock speed (discussed further below) when accounting for both memory and non-memory operations.

In particular, there are various clocks that may be used in performing emulation or prototyping. Model clock speed (also known as model clock frequency) is the virtual speed of the model, which may typically be in the GHz range. Emulation compile speed (also known as emulation clock frequency) is dependent on the wall clock speed, which is the speed at which the user register-transfer-level (RTL) SOC model is compiled on the emulator and is expected to run (and typically in the MHz range). In operation, higher compile speeds are preferable.

The wall clock speed may vary depending on the environment in which a given chip is run. For purposes of illustration and comparison only, the wall clock speed for a given SOC (e.g., CPU, GPU, network-on-a-chip (NOC), etc.) run in a software simulator is 10-100 Hz, in an emulator is 1-2 MHz, in FPGA prototyping is 5-50 MHz, and when finally fabricated on Silicon is 1-3 GHz. Thus, the ultimate speed of the SOC may be at least one, at least two, or at least several orders of magnitude greater than when performing emulation or prototyping.

Comparing wall clock speed of the real SOC (e.g., when ultimately fabricated on Silicon) to different modeling environments, such a simulators, emulators, and FPGA prototypes, is relevant for several reasons. First, the comparison illustrates the virtual SOC view. In particular, modeling provides the user a virtual SOC view for verification, where the SOC design speed is virtually shown in GHz (similar to the speed of the SOC on silicon), although the underlying modeling implementation is running significantly slower, such as in the KHz or the MHz ranges. In this regard, the user, for all practical purposes if not informed explicitly, cannot discern the real chip from a modeled environment. This is akin to flight simulators, which presumably operate at speeds of 600 mph for a user. Second, the modeling environment, such as the simulator, emulator, FPGA modeling environments, may be paused and/or stalled (even for hours on end). Though, the user virtual SOC view and the modeling semantics may be kept intact. This allows, for example, the emulator device to communicate with external devices, such as interact with a connected host and/or to fetch or send data from the host. In the example of a flight simulator, the user may pause the flight landing, and thereafter resume.

An emulation stall (interchangeably termed an emulation pause) may comprise a typical time-interval where wall clock time will advance, but model time will stall/pause. As discussed in more detail below, stalls may be used in a variety of contexts. As one example, stalls may be used when hardware debug data buffers are full and data needs to be offloaded to the host. As another example, stalls may be used when the virtual model needs data from the host and modeling semantics expect the operation to consume 0 Model time (e.g., obtaining data due to a cache-miss). The greater the number of stalls, the longer the wall clock time will be to run a particular user model.

The emulation runtime speed is the final effective wall clock speed at which the user model runs after accounting for model stalls/pauses due to host related activities.

Figure 6:
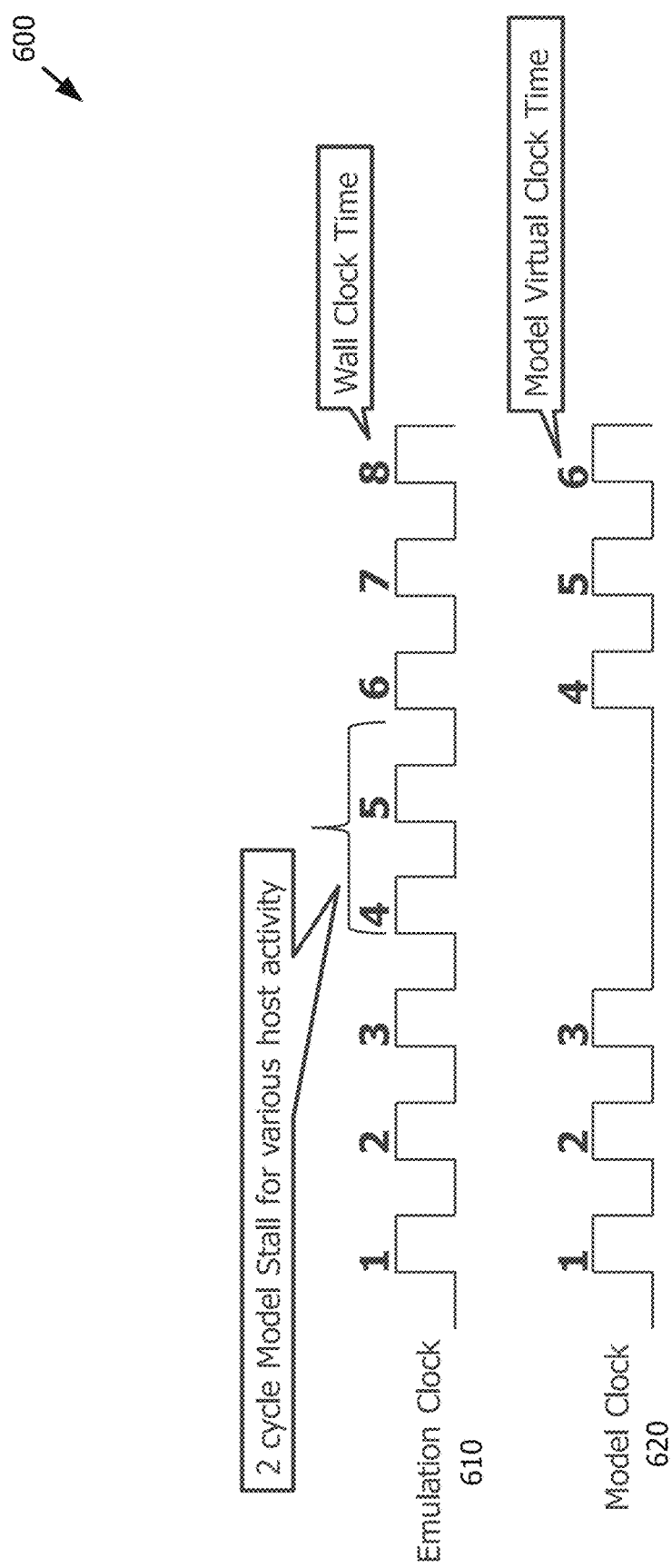
FIG. 6 illustrates the emulation clock and the model clock.

Emulation throughput may be represented in a variety of ways, such as in the number of model clocks executed for a given count of emulator clocks. This shown in the illustration 600 in FIG. 6, which includes the emulation clock 610 and the model clock 620. Specifically, the emulation clock 610 is indicative of the wall clock time, and the model clock 620 is indicative of the model virtual clock time. As shown in FIG. 6, clock cycles 4 and 5 of the emulation clock 610 are a 2 cycle model stall that may be for various host activity. As such, the emulation throughput is 75% (6/8) due to the 2 cycle stall. In practice, a lower number of model stalls is preferred.

As discussed above, user design memories may be modeled, such as on an emulator/FPGA, in one of several ways in order to optimize emulation cost, speed and board capacity. One way is using on board memories, which may optimize emulation compile speed and emulation runtime speed since no model clock stalls are required as complete memory is on the hardware. Another way is using cache-based memories. A small percentage (such as typically <1%) of user memory is cached on the hardware, and the full memory is resident on the host machine. Cost and capacity may be optimized with some impact on emulation compile speed (due to complex infrastructure) and some impact on emulation runtime speed (due to model clock stalls required to fetch memory contents not present in cache, such as due to a cache-miss). Still another is using complete software-based memories in which the capacity may be optimized aggressively by keeping the complete model memory on the host machine with considerable impact on emulation runtime speed. Specifically, there are a large amount of model clock stalls that are required to service memory requests.

Figure 7A:
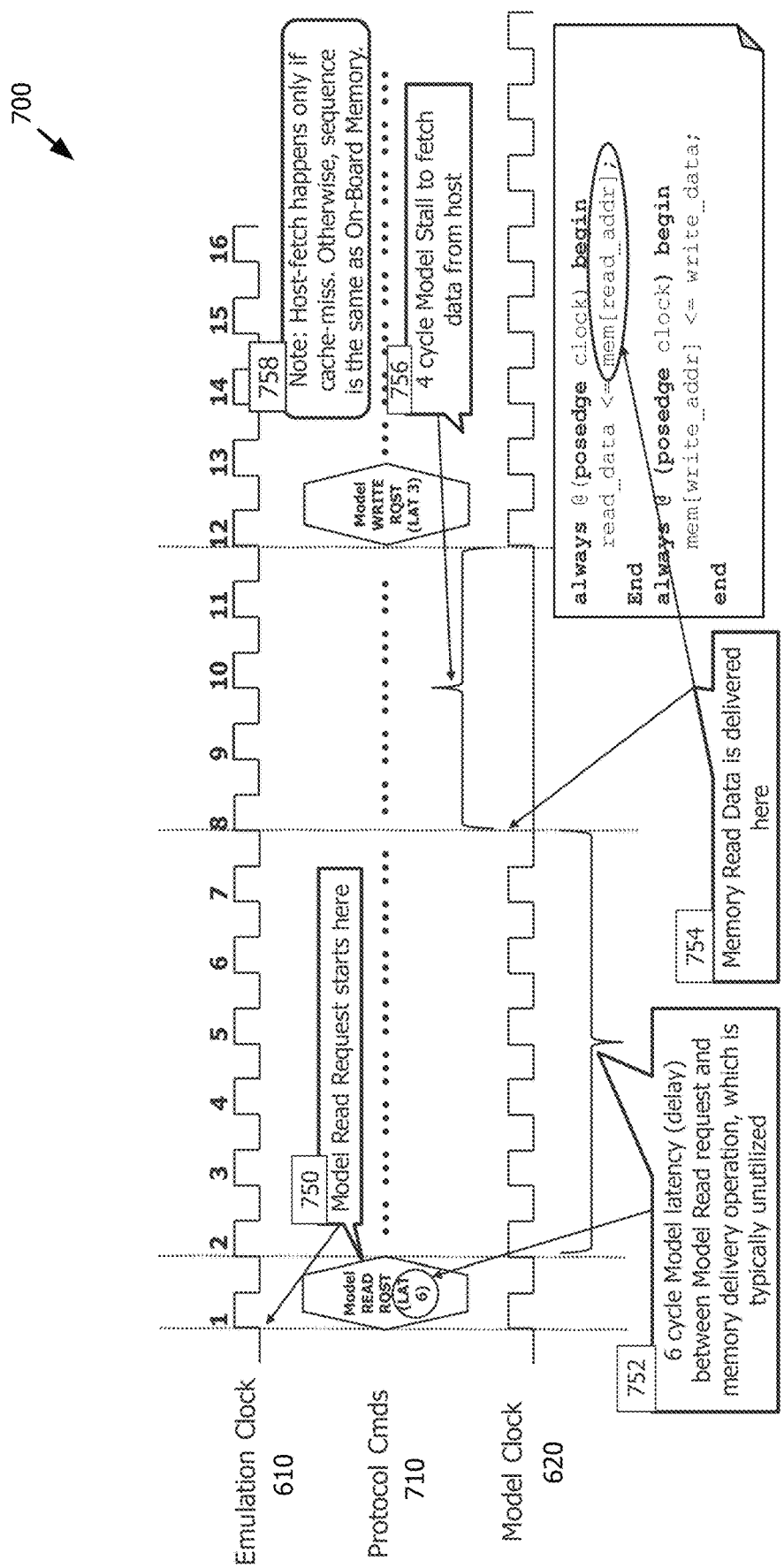
FIG. 7A illustrates a diagram of the steps of a typical cache-based memory implementation showing the emulation clock, the protocol commands and the model clock.

FIG. 7A illustrates a diagram 700 of the steps of a typical cache-based memory implementation showing the emulation clock 610, the protocol commands 710 and the model clock 620. At 750, the model read request starts at emulation clock cycle 1. For purposes of illustration, the model read/write requests shown in FIGS. 7A-B have associated latency (e.g., memory read request latency=6 and memory write request latency=3). However, typical protocol commands do not include any indication of latency. This is in contrast to protocol commands discussed below that indicate latency. Rather, the latency associated with the commands is highlighted merely for explanation. Thus, as shown, the latency for the model read request is 6 cycles (illustrated by LAT 6). 752 illustrates the 6 cycle model latency (e.g., delay) between the model read request and memory delivery operation (shown from cycles 2-7), with these cycles typically being unutilized. At 754, the memory read data is delivered (as shown by the inset portion of code). Further, because a cache-miss occurs, the data is fetched from the host. This is shown at 756 by the 4 cycle model stall (e.g., 4 cycles are used to fetch the data from the host), whereby the emulation clock 610 continues cycling but the model clock is paused for 4 cycles. At 758, it is noted that the host-fetch occurs only in the event of a cache-miss. Otherwise, the sequence illustrated in FIG. 7A is the same as on-board memory illustrated in FIG. 7B.

Figure 7B:
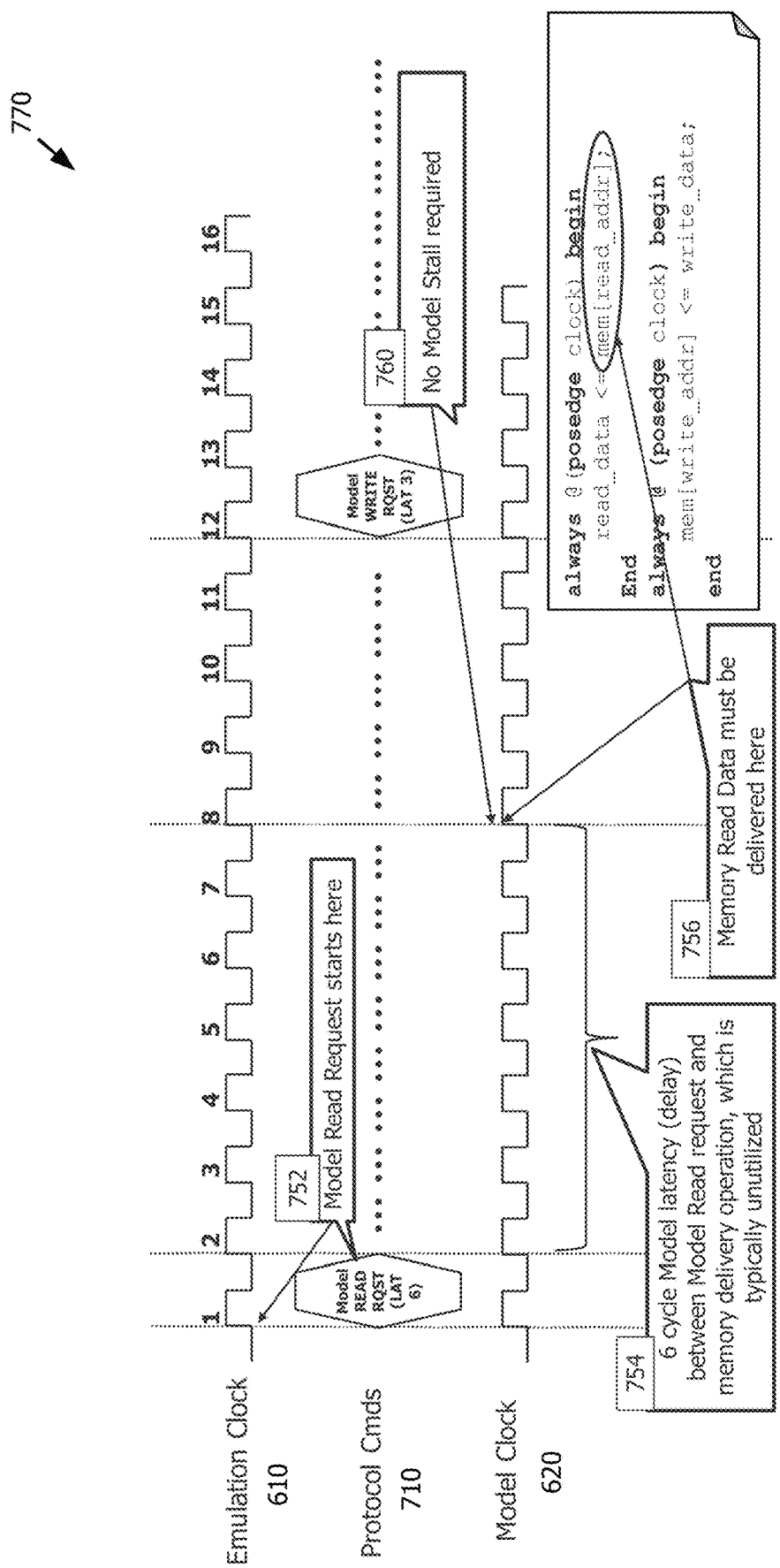
FIG. 7B illustrates a diagram of the steps of a typical on-board memory implementation showing the emulation clock, the protocol commands and the model clock.

FIG. 7B illustrates a diagram 770 of the steps of a typical on-board memory implementation showing the emulation clock 610, the protocol commands 710 and the model clock 620. FIG. 7B is similar to FIG. 7A, except at 760, no model stall is required since no fetch is required.

The typical software-based memory implementation is similar to the cache-based implementation illustrated in FIG. 7A in that model stalls are required. However, in the cache-based memory implementation, cache hits are typically greater than 98%. In this regard, model stalls are required only 1-2% of the time, when the memory word is not present in hardware cache. However, in a complete software-based memory implementation, model stalls are required 100% of the time for every memory protocol read request. For memory protocol write requests, streaming write optimizations may be performed to avoid model stalls.

As discussed above, the model may include variable latency and minimum latency. For example, the memory model may receive a read or write command (e.g., a request) to the memory with varying amounts of latencies (e.g., delays), after which the response is desired. This response delay is known as the memory model variable latency. The memory model variable latency may vary (e.g., each read or write command may have a different latency value associated with it).

As another example, the memory protocol IEEE specification guarantees that no read or write request to the memory model may have the associated variable latency lower than a minimum threshold value. This minimum latency IEEE specification is an example of a memory model minimum latency. The memory model variable latency may comprise an artifact of the virtual SOC view and may not be optimized away. In particular, model clocks will be consumed, and only after that many model clocks, memory data will be available. In particular, the memory model variable latency mimics the real chip scenario where memory responses are delayed. As discussed in more detail below, during various latency periods, such as the latency period for the memory model variable latency and/or the memory model minimum latency, the rest of the SOC may perform useful work, and need not sit idle. This is in contrast to the typical situation illustrated in FIG. 7A-B at 754.

Figure 8:
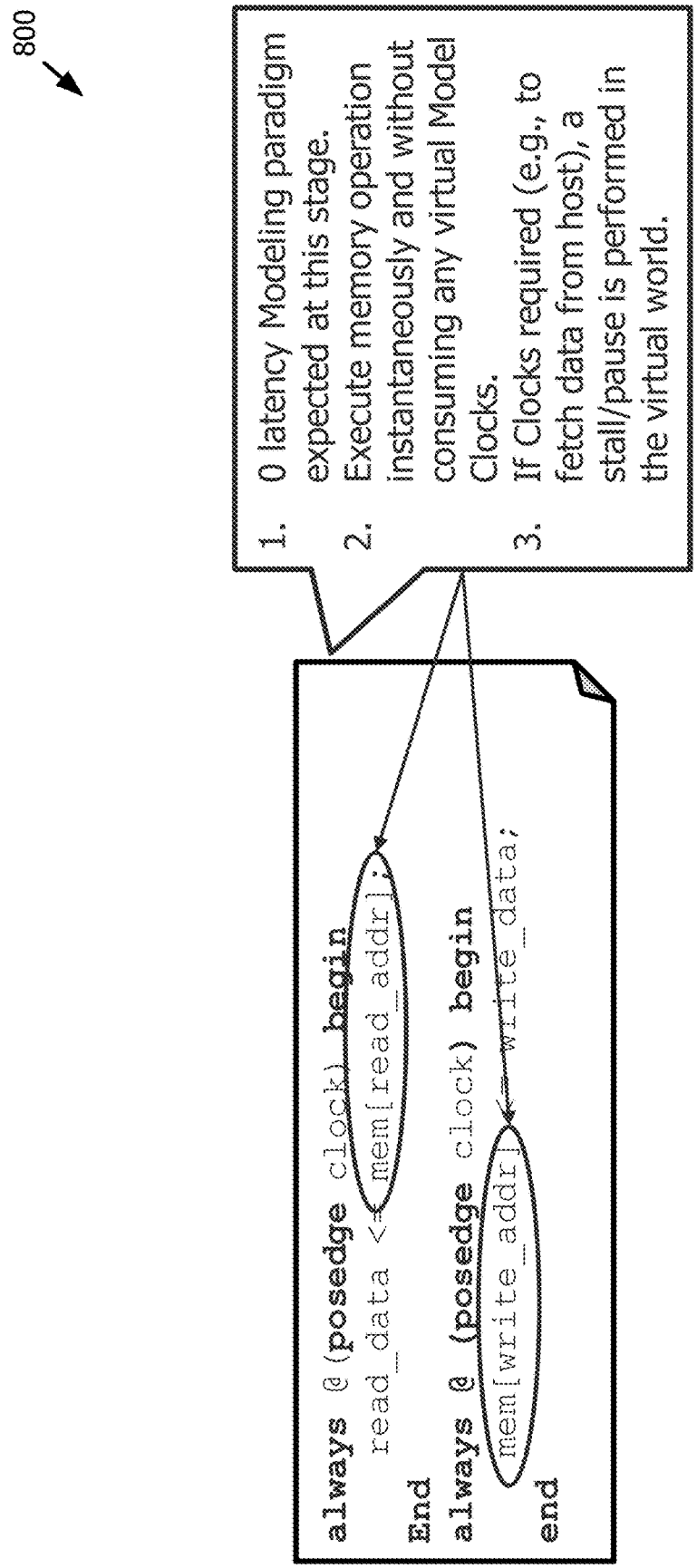
FIG. 8 illustrates system calls and associated latency.

Typically, each modeling implementation, including using on-board memories, cache-based memories, or complete software-based memories, are completely ignorant about one or more aspects regarding latency, such as the memory model variable latency associated with a command. Hence, the modeling for these implementations operate on the memory at the last stage of memory access, which has a zero latency memory access modeling paradigm. This is illustrated in the diagram 800 in FIG. 8, in which a zero latency modeling paradigm expected at this stage, in which a memory operation (e.g., read (mem(read_addr) and/or write (mem(write_addr)) is executed instantaneously and without consuming any virtual model clocks, and in which if clocks are required (e.g., to fetch data from host), a stall/pause is performed in the virtual world.

As discussed above, memory models may benefit from knowledge of latency associated with a read and/or write command. As one example, the on-board memories implementation may have its emulation compile speed improved or optimized further by creating a pipelined structure (explained in further detail below). As another example, the cache-based memories implementation may have its: (i)

emulation compile speed improved or optimized by creating a pipeline-based cache structure; and/or (ii) emulation runtime speed improved or optimized by utilizing earlier unused model clocks to fetch data from host sooner (e.g., responsive to a cache-miss). As still another example, the complete software-based memories implementation may have its emulation runtime speed improved or optimized by utilizing earlier unused model clocks to fetch data from the host sooner.

The below discussion uses a cache-based memories implementation as an example. Similar infrastructure may be created and its benefits may likewise be understood for other implementations, such as the on-board memories implementation and the complete software-based memories implementation.

Figure 9:
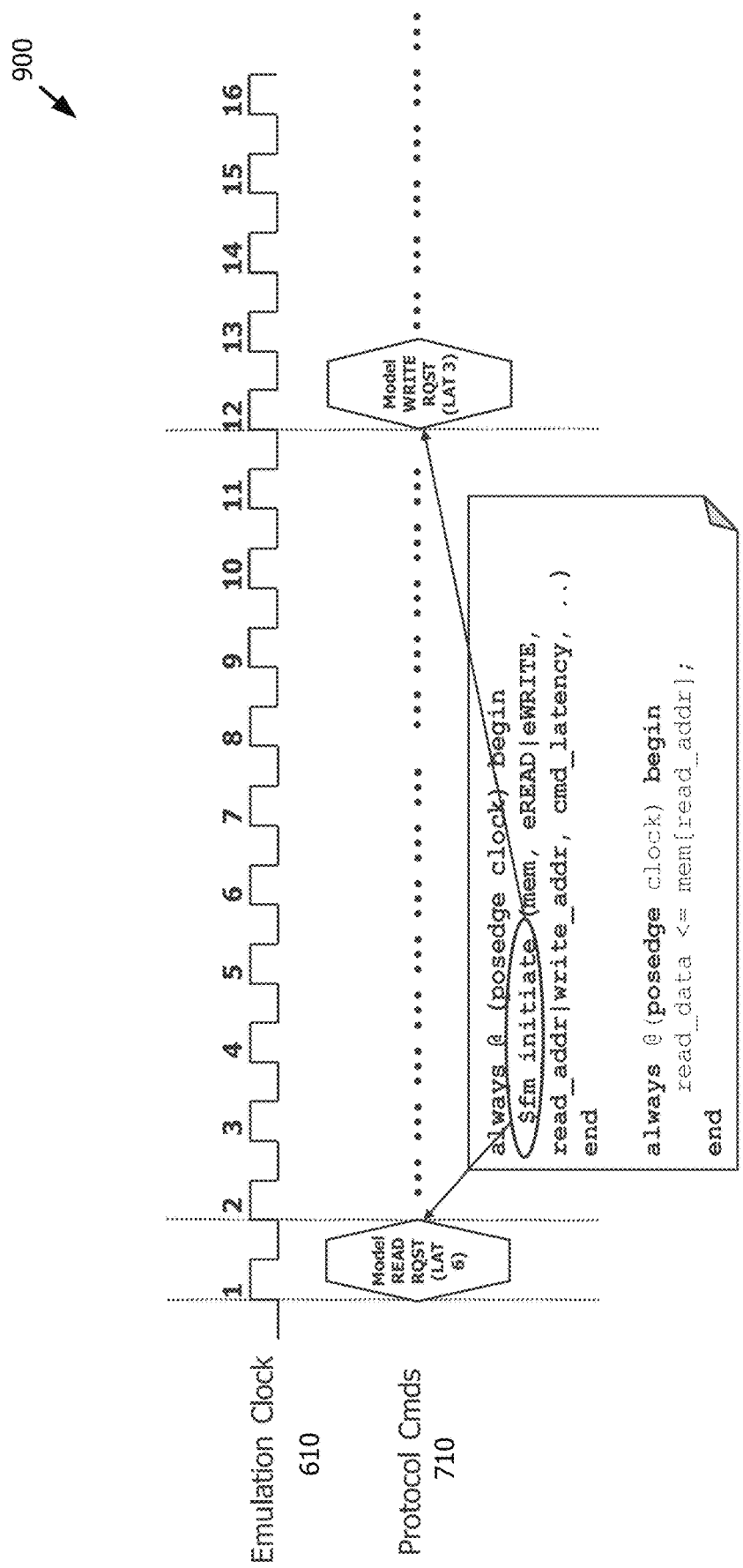
FIG. 9 is an illustration of the emulation clock and the protocol commands, including memory read and memory write commands.

FIG. 9 is an illustration 900 of the emulation clock 610 and the protocol commands 710, including memory read and memory write commands. One, some, or each of the memory implementations, such as the on-board memories implementation, the cache-based memories implementation, and the complete software-based memories implementation, may be made aware of latency associated with one, some, or all system calls, such as one or both of memory read commands or memory write commands. Further, the notification of the latency associated with the system calls may be made at various times. In one embodiment, the notification of the latency associated with the system calls may be made as soon as the request is made to the memory model. For example, as illustrated in FIG. 9, the memory read request (Model READ RQST) includes an indication of the latency (see LAT 6, indicative of a latency of 6 cycles). As another example, the memory write request (Model WRITE RQST) includes an indication of the latency (see LAT 3, indicative of a latency of 3 cycles). Further, FIG. 9 illustrates an example of the arguments for the request, as shown in the following: $fm_initiate (mem, eREAD|eWRITE, read_addr|write_addr, cmd_latency, . . . ). Thus, $fm_initiate indicates the request, and includes an argument (cmd_latency) to indicate the latency associated with the command. Instead of (or in addition to) specifying the latency for each request, the latency associated with a set of commands may be specified. For example, the latency may be designated for all read requests (or all read requests of a certain type). As another example, the latency may be designated for all write requests (or all write requests of a certain type). In this way, the memory model may be made aware of latency for each request.

As discussed above, various types of latency may improve operation of the model. As one example, knowledge of memory model variable latency may be used in one of several ways to improve the design wall clock time. In particular, any one, any combination, or all of the following use-models incorporating knowledge of memory model variable latency may improve the design wall clock time: (i) utilizing the memory model variable latency to only reduce the number of model stalls, and improve emulation runtime speed; (ii) utilizing the memory model variable latency to improve emulation compile speed (e.g., by adding only pipeline flops around compile infrastructure); or (iii) judiciously using the model variable latency to improve both (i) and (ii).

Figure 10:
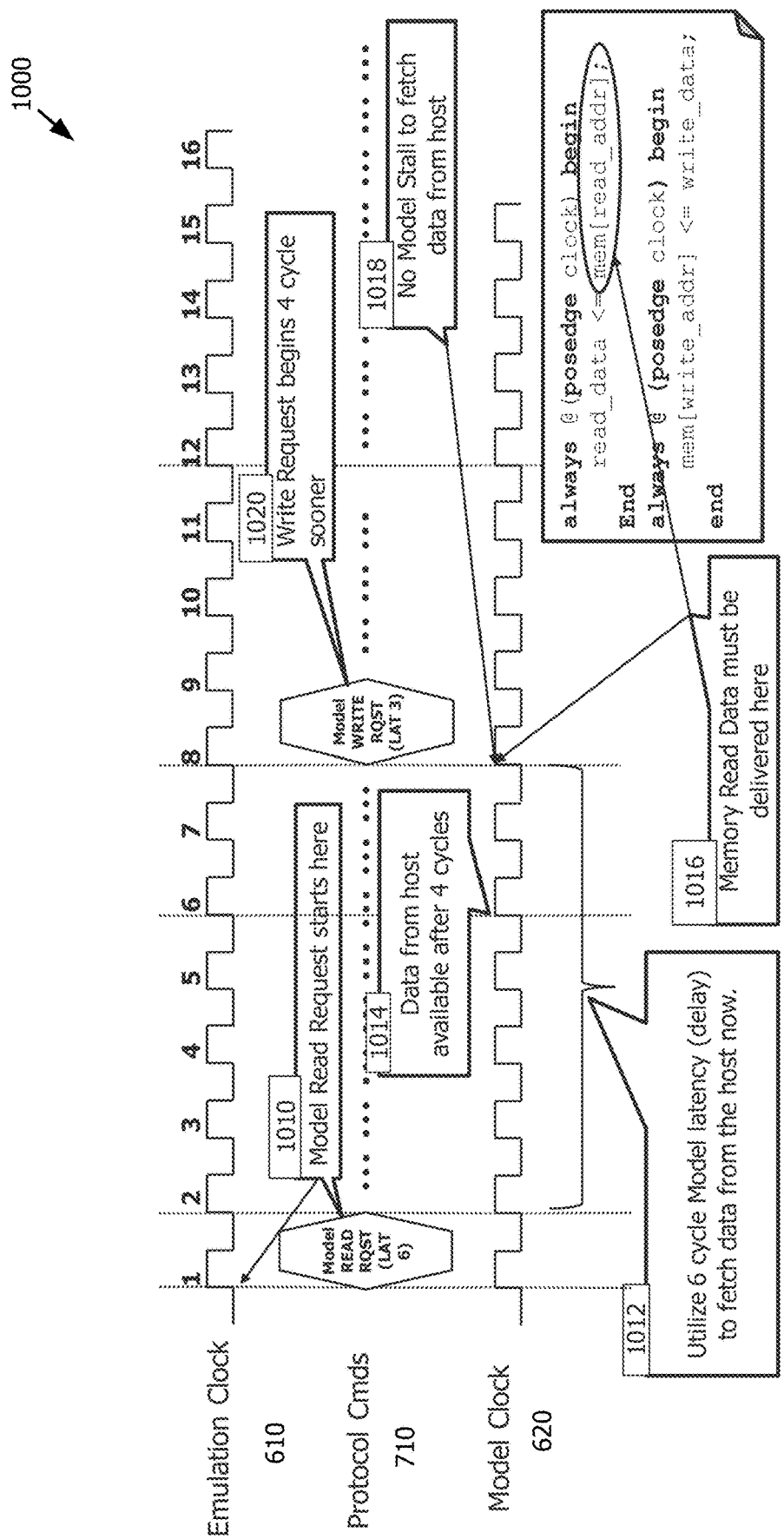
FIG. 10 is an illustration of reducing or minimizing model stalls by fetching cache-miss data from the host responsive to or as soon as the read request begins.
Figure 11:
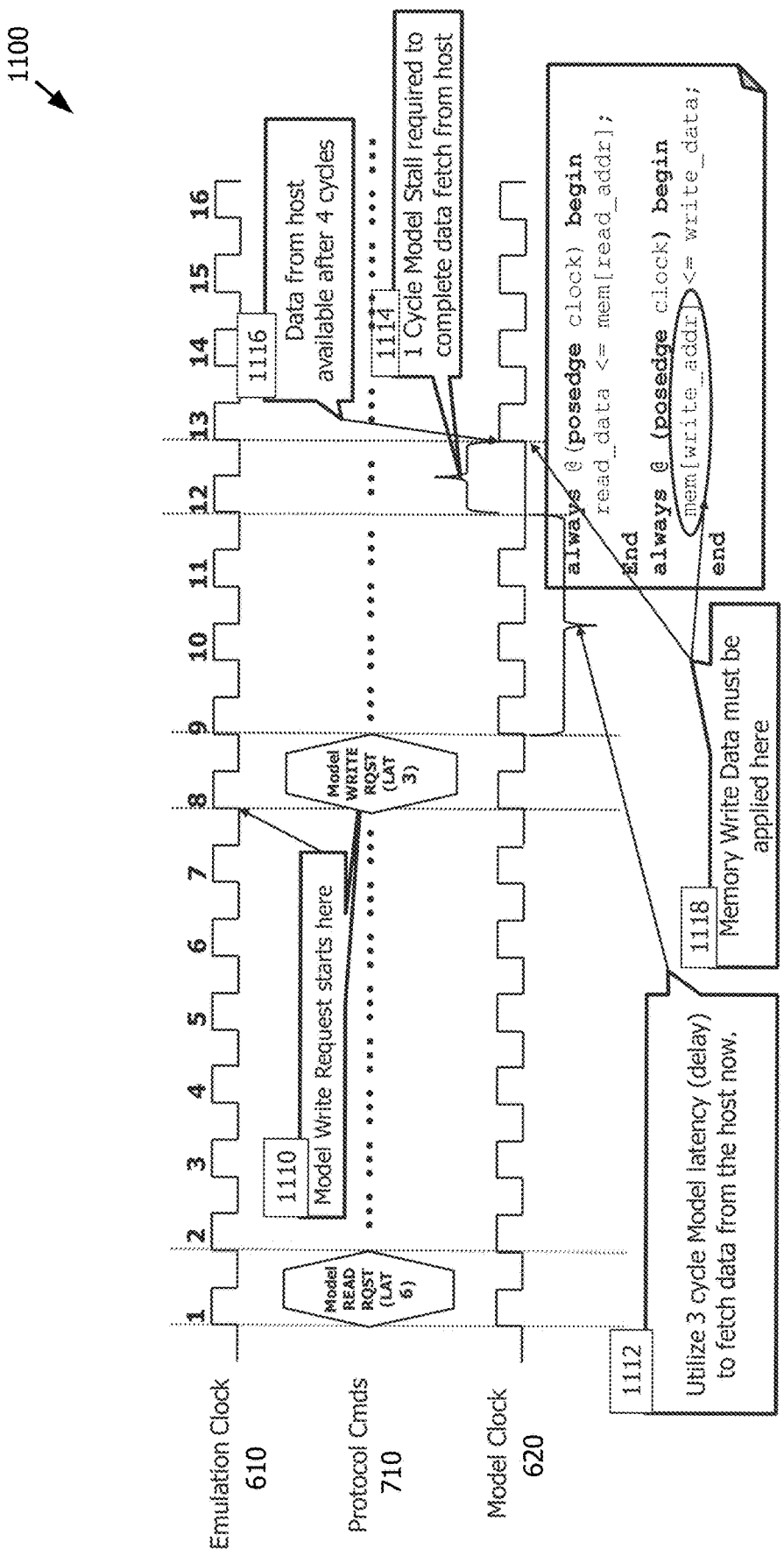
FIG. 11 is an illustration of minimizing model stalls by fetching cache-miss data from the host as soon as or responsive to the write request beginning.

FIGS. 10 and 11 illustrate examples of (i) of utilizing the memory model variable latency to reduce the number of model stalls. In particular, FIG. 10 is an illustration 1000 of minimizing model stalls by fetching cache-miss data from the host responsive to or as soon as the read request begins. In particular, at 1010, the model read request begins. As discussed above, the model read request may have associated with it a latency (shown as LAT 6), which may be designated as part of the request or may be designated prior to the request. At 1012, the 6 cycle delay (indicated as LAT 6) is utilized to fetch data from the host. In this example, the fetch from the host engenders a delay of 4 cycles. As such, in one embodiment, immediately after or responsive to the request at 1010 being made in emulation clock 610 cycle 1, the fetch of data from the host is performed at emulation clock 610 cycle 2. In this way, the fetched data is available by emulation clock 610 cycle 6, well within the 6 cycle delay for the read request. This is in contrast to FIG. 7A, which does not utilize the 6 cycle delay at all. Because the data is fetched from the host during the 6 cycle delay, at 1014, the fetched data is available. At 1016, the memory read data is delivered. Further, as shown at 1018, there is no stall due to fetching data from the host. In turn, at 1020, the write request may begin 4 cycles sooner than that depicted in FIG. 7A because no stall has occurred.

FIG. 11 is an illustration 1100 of minimizing model stalls by fetching cache-miss data from the host as soon as or responsive to the write request beginning. At 1110, the model write request begins (with a latency of 3 cycles). At 1112, the 3 cycle model latency (e.g., delay) is used to fetch data from the host. This is unlike typical modeling, where the delay is unutilized. It is noted that fetching data from the host necessitates 4 cycles. Thus, at 1114, there is 1 cycle of stall to complete the data fetch from the host. At 1116, the fetched data is then available from the host after 4 cycles. So that, at 1118, the memory write data may be applied as indicated (after the 1 cycle of stall).

As discussed above, under (ii), memory model variable latency may be used to improve emulation compile speed, such as by adding only pipeline flops around compile infrastructure. With regard to design pipeline, the emulation compile speed may be improved by breaking down the complex cache-infrastructure design path by inserting flops. This is akin to dividing an overall process into a set of discrete smaller tasks (for illustration purposes, the MacDonald's Restaurant Drive-Through Service divides the overall process into 3 smaller tasks including performing the order, paying and picking up the food to speed up the overall process). Thus, although a main purpose of pipelining is to improve throughput (e.g., number of tasks done in a unit time), pipelining has an added indirect advantage of improving design compile speed by reducing the critical path of the design circuitry.

Figure 12:
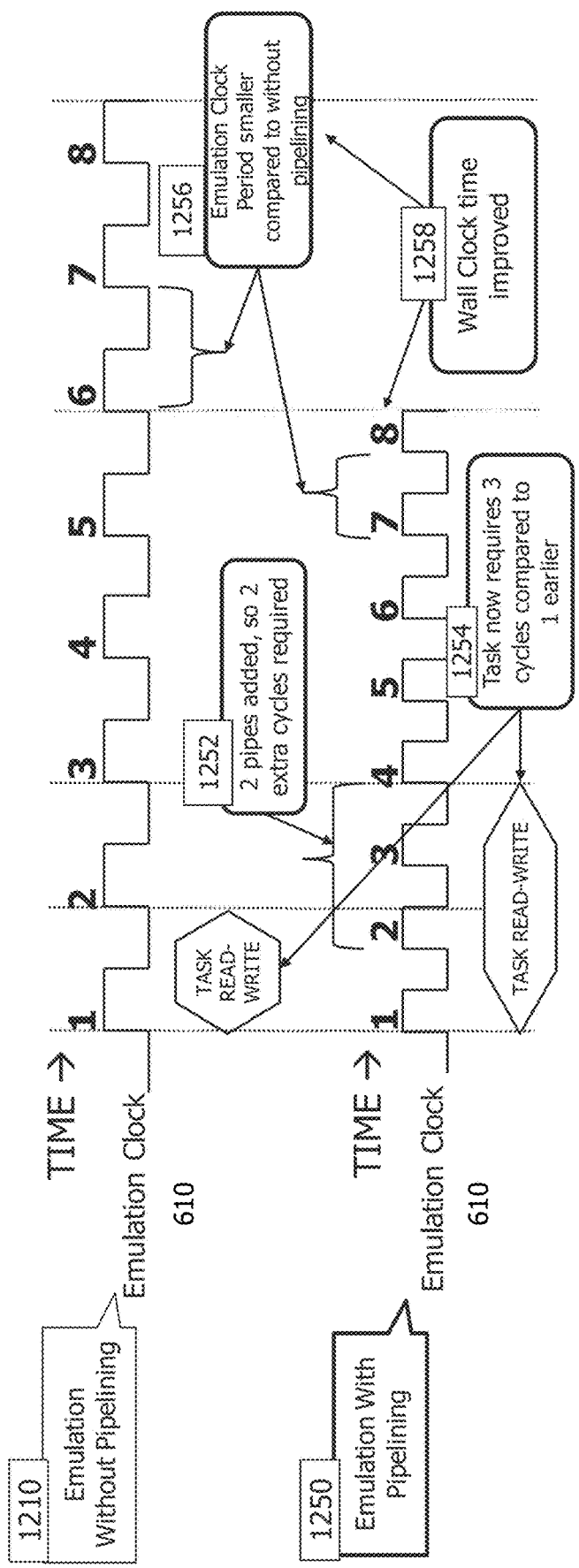
FIG. 12 illustrates timing diagrams for emulation with and without pipelining for latency-aware cache-based memory modeling.

FIG. 12 illustrates timing diagrams for emulation with and without pipelining for latency-aware cache-based memory modeling. Specifically, FIG. 12 illustrates the emulation clock 610 where emulation is performed without pipelining (1210) and where emulation is performed with pipelining (1250). As shown in FIG. 12, a task, such as a read or a write, without pipelining requires 1 cycle (see cycle 1 for emulation clock 610 where emulation is performed without pipelining (1210)). In contrast, a task, such as a read or a write, with pipelining requires a greater number of cycles than the task performed without pipelining. Specifically, the read or write task requires 3 cycles to be performed instead of only 1 (shown at 1254) due to 2 pipes being added, requiring 2 extra cycles (shown at 1252). Thus, the read or write task spans across cycles 1-3 of the emulation clock 610 where emulation is performed with pipelining (1250). Further, as shown at 1256 in FIG. 12, emulation clock 610 where emulation is performed without pipelining (1210) has a longer period than emulation clock 610 where emulation is performed with pipelining (1250). Finally, because of the change in period, the wall clock time is improved for emulation performed with pipelining versus without pipelining (as shown at 1258). Thus, there is an associated cost with pipelining, namely the addition of clock cycles; however, the overall emulation compile speed may increase significantly. Further, if the additional clock cycles can be partly or entirely taken from unutilized memory model variable latency cycles, the emulation compile speed may be improved, optionally with zero clock cycle penalty.

Figure 13:
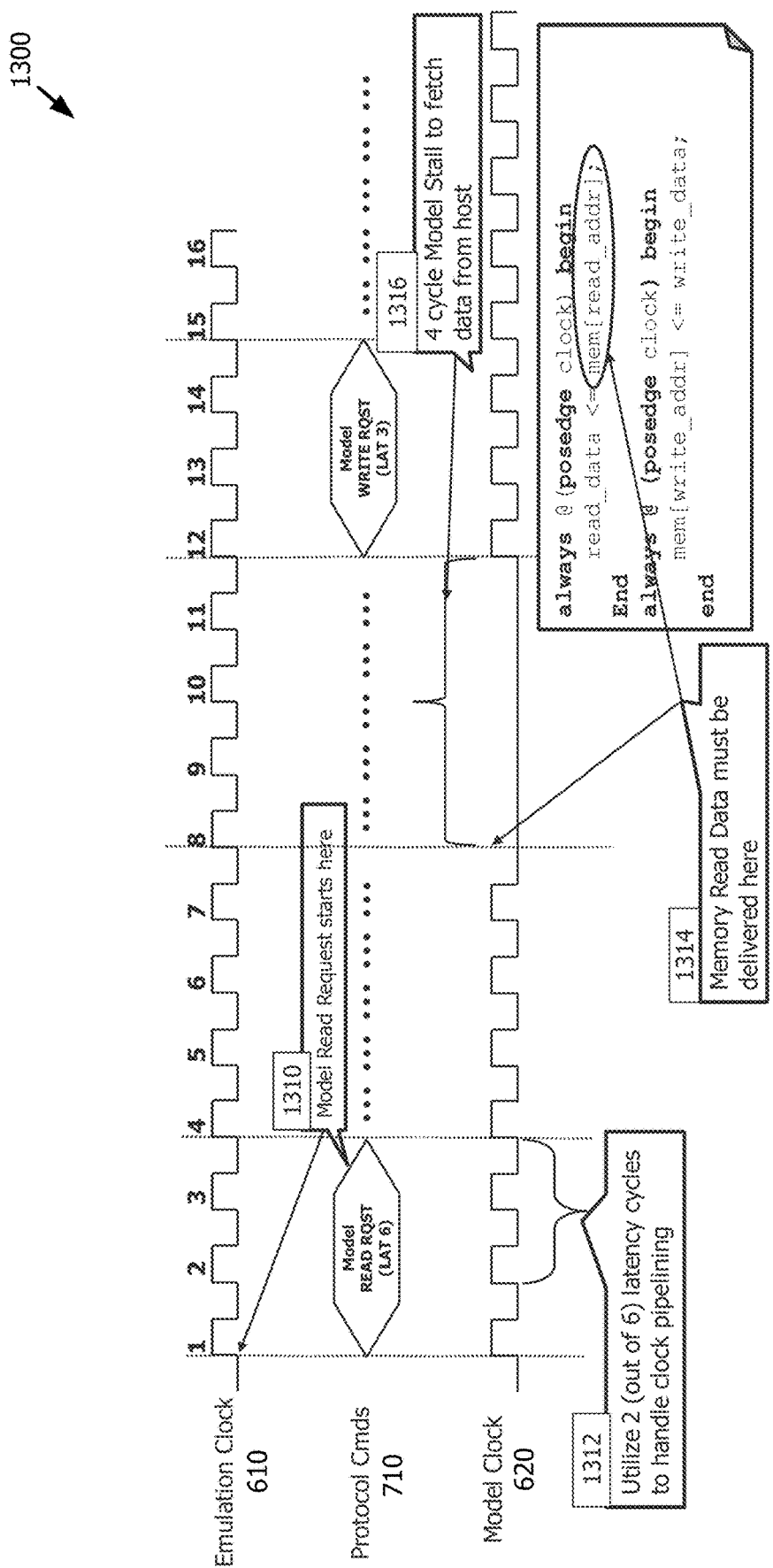
FIG. 13 is an illustration of pipelining for cache-based memory modeling.

FIG. 13 is another illustration 1300 of pipelining for cache-based memory modeling. Specifically, FIG. 13 illustrates a 2-stage pipeline inserted whereby the 2 cycles are borrowed from the latency of the read command (e.g., the 6 cycles of latency 6 of READ command). At 1310, the model read request begins. As noted in FIG. 12, with pipelining, the model read request spans additional cycles (from cycles 1-3) and the model write request spans additional cycles (from cycles 12-14). Further, as shown at 1312, 2 of the 6 latency cycles are utilized to handle clock pipelining. At 1314, after the 6 latency cycles (from cycles 2-7), the memory read data is delivered. At 1316, there is a stall, such as a 4 cycle stall, to fetch data from the host (e.g., due to a cache miss).

As discussed above, knowledge of model variable latency may be used according to both of the following: (i) utilizing the memory model variable latency to only reduce the number of model stalls, and improve emulation runtime speed; and (ii) utilizing the memory model variable latency to improve emulation compile speed. In one or some embodiments, the memory model variable latency may be divided into multiple parts, such as into at least two parts including: (1) a fixed implementation latency; and (2) a variable implementation latency. For example, with regard to the fixed implementation, the first part may be utilized to cover for additional "fixed" clock cycles required for extra pipelines stages. With regard to the variable implementation latency, the second part may be utilized to cover for model stalls required to fetch data from host. The variable implementation latency is termed "variable" since no stalls are necessary if the data is already present in cache (e.g., there is no cache-miss). Further, model stalls may be necessary for those commands for which the (fixed implementation latency+variable implementation latency)>memory model variable latency. In this regard, the latency in the different situations may be variable.

Merely by way of example, 4 extra pipeline stages may be chosen to improve emulation compile speed. The model may then require a "fixed" 4 additional clock cycles for every command. In the context of write commands with latency 3, the 4 additional clock cycles would imply a 1 cycle model stall (e.g., for each write, there is always a 1 cycle stall), regardless of whether data is present in cache or not. When there is cache-miss, additional model stalls may be necessary to fetch data from host.

Figure 14:
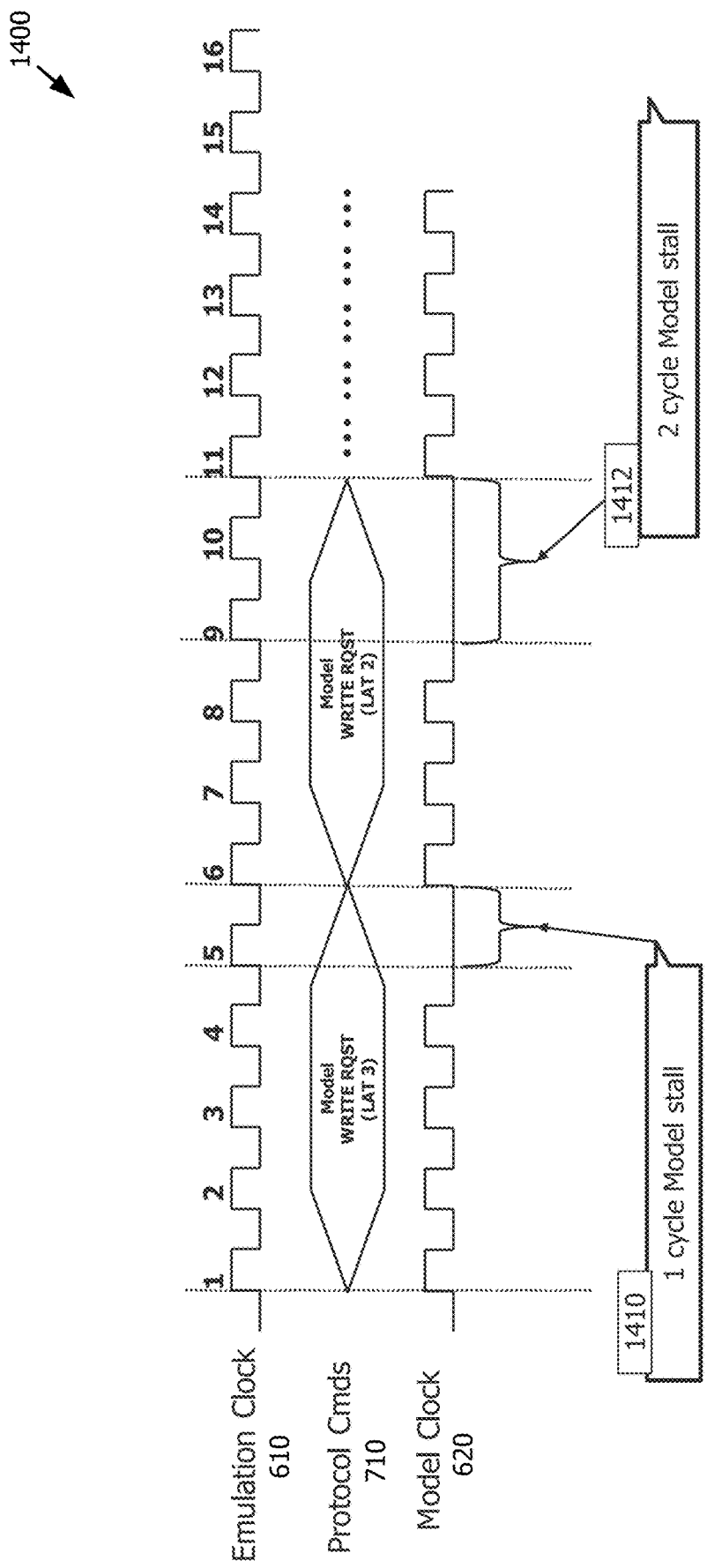
FIG. 14 is an illustration of splitting the model variable latency into at least two parts.

FIG. 14 illustrates the effect of having a large fixed implementation latency. Specifically, FIG. 14 is an illustration 1400 of an example of dividing the memory model variable latency into at least two parts. As shown in FIG. 14, the fixed implementation latency of 4 is greater than the latency for the write request (with a latency of 3). Thus, there is at least 1 cycle model stall for commands with memory model variable latency less than 4, even if data present in cache. For example, a first model write with a latency of 3 results in a stall of 1, as shown at 1410. As another example, a second model write with a latency of 2 results in a stall of 2, as shown at 1412.

Thus, in one or some embodiments, the fixed implementation latency is kept to be less than or equal to the minimum model latency (such as the minimum model latency guaranteed by the IEEE specification for a given memory protocol) and no model command may come with a variable latency less than the minimum model latency. Such a splitting thus ensures no model stalls due to pipeline stages, especially when data available in cache. Variable implementation latency may then consume the remaining memory model variable latency to minimize the model stalls as much as possible, such as during cache miss.

It is further noted that under certain circumstances having a fixed implementation latency greater than the minimum model latency may be advantageous. As such, in one or some embodiments, the memory compiler may select to implement the same. For example, for a given minimum model latency (e.g., 2), the memory compiler may identify that introducing more pipeline stages (such as 4, thus resulting in a fixed implementation latency of 4) improves the emulation compile speed significantly. Further, given a statistical design fact that Memory READ/WRITE commands with model variable latency is less than minimum model latency occur infrequently and are a very small fraction of the total Memory READ/WRITE commands, the overall gain in emulation compile speed with pipelining (4-stage for this example) may easily counterbalance a very small subset of model stalls. In this way, the overall wall clock time required to run the design model may be reduced or minimized.

Figure 15:
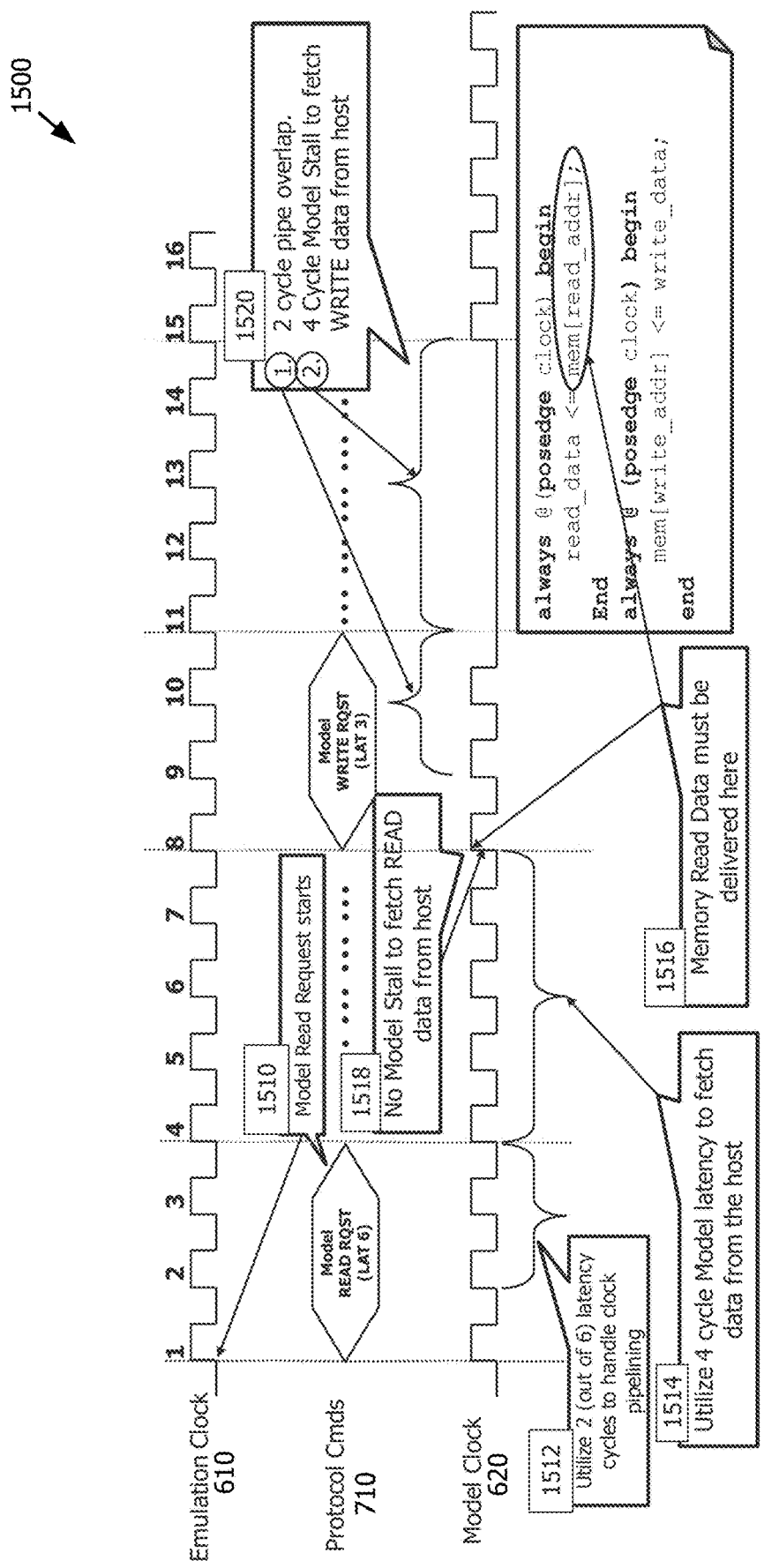
FIG. 15 is an illustration of utilizing the memory model variable latency to reduce the number of model stalls, to improve emulation runtime speed, and to improve emulation compile speed.

FIG. 15 is another illustration 1500 of using model variable latency according to both of the following: (i) utilizing the memory model variable latency to only reduce the number of model stalls, and improve emulation runtime speed; and (ii) utilizing the memory model variable latency to improve emulation compile speed. At 1510 the model read request begins. At 1512, 2 out of the 6 cycles (from the latency for the read request) are utilized to handle clock pipelining. At 1514, 4 cycles are used to perform the data fetch from the host. At 1516, the memory read data is then delivered. At 1518, there is no model stall to fetch the read data from the host. 1520 illustrates the model clock 620 for the write request, whereby there is a 2 cycle overlap (2 pipelines that overlap 2 cycles of the three cycle latency from the write request) and a 4 cycle model stall to fetch the write data from the host. Thus, for a READ command (with a latency of 6), with a 2 cycle pipeline cost and a 4 cycle host fetch cost, there is no model stall required, whereas for WRITE command (with a latency of 3), there is a 4 cycle cost.

Thus, even though the discussion above is focused on a cache-based implementation, the above discussion may be applied to the different memory implementations discussed herein. For example, an on-board memories implementation may improve or optimize emulation compile speed further by creating a pipelined structure. For a cache-based memories implementation, the emulation compile speed may be improved or optimized by creating a pipeline-based cache structure and/or the emulation runtime speed may be improved or optimized by utilizing earlier unused model clocks to fetch data from the host sooner. For the complete software-based memories implementation, the emulation runtime speed may be improved or optimized by utilizing earlier unused model clocks to fetch data from the host sooner. In this way, latency-aware memory compiling may provide higher emulation compile speed and/or reduce or minimize the number of model stalls.

FIG. 16 illustrates code 1600 as an example modeling paradigm. Structurally, associated with any memory may include one or more static signals, such as any one, any combination, or all of: read/write address bus; burst length; actual latency; and one or more latency constants (such as one or both of minimum latency and maximum latency). Further, functionally, a memory protocol may include one or both of the following phases: (i) a command Initiation/Request phase (e.g., when a read/write request is sent to the memory); and (ii) a command Mature phase (e.g., the exact time at which the read/write data is made available on the bus).

During command initiation phase, the user may provide the operation (e.g., any one, any combination or all of: READ; WRITE; UTIL; no-op (NOP); etc.) that is to be performed via $fm_initiate( ) system task. As merely one example, on every double data rate (DDR) clock cycle, the user may take an action (e.g., eNOP; eREAD; eWRITE; eUTIL). Further, if the action is eREAD or eWRITE, the user may provide any one, any combination, or all of the current address, burst length (BL) and latency values that will be sampled and the request queued.

For command mature phase, the user need not maintain internal timers before reading or writing to the memory. Rather, the $fm_cmd system function may be used to check which previously initiated command has matured. If a read or write command has matured, then the returned data struct (fm_cmd_data_t) may be used to construct exact addresses for the complete burst length. Of not, in the memory protocols, it is the memory read/write address and burst length that is known a priori at the time of command initiation. The other parameters, such as read/write enables, write data, byte-enables, may be provided by the protocol at the exact time of command maturation.

For purposes of illustration, a DDR5 protocol example is considered that makes a read request at address 23 (0001 0111) for a burst length of 16 (BL16). A latency of 8 cycles is assumed for simplicity and that no read/write command has been issued so far.

At time=t0, $fm_initiate(mem0, eREAD, 23/*addr*/, 16/*BL*/, 8/*latency*/, 8/*min latency*/) is enqueued.

Then, from time=t0 to t7 (8 cycles), $fm_cmd will return eNOP. Specifically, $fm_cmd(mem0) will return fm_cmd_data_t={0/*i.e. 0 as base addr*/, 0/*i.e. 0 as start_addr_offset*/, 0/*bl tick*/, eNOP/*cmd*/}.

At time=t8 posedge, the DDR read always block will see a valid eREAD cmd: $fm_cmd(mem0) will return fm_cmd_data_t={16/*i.e. 0001 0000 as base_addr*/, 7/*i.e. 0111 as start_addr_offset*/, 0/*bl tick*/, eREAD/*cmd*/}. It is noted that 16+7=23 is the start address with which the user initiated the read.

From time=t9 to t15 edges, the only change in $fm_cmd( ) would be the bl_tick values, which transition from 1 to 7. $fm_cmd(mem0) will return {16/*i.e. 0001 0000 as base addr*/, 7/*i.e. 0111 as start_addr_offset*/, 1-7/*bl tick*/, eREAD/*cmd*/}. It is noted that a burst length of 16 necessitates 8 DDR cycles to complete and a burst length of 8 necessitates 4 DDR cycles to complete.

At time=t16, the $fm_cmd( ) will return eNOP, if no new command was $fm_initiated at t8. Given the t0 command's BL is 16, any new command prior to t8 may be considered a violation of the protocol.

As discussed above, minimum and/or maximum latencies may be used to create infrastructure. For example, minimum and maximum latencies (MIN_LATENCY, MAX_LATENCY) may be used to create the pipeline and FIFO infrastructure. In one or some embodiments, the user may initiate a new command only after a minimum delay of pBL/2 cycles (where pBL is the burst length of previous read/write command). This delay may be independent of DDR latency. For example, if the current command has a burst length 8 and the latency is 100 cycles, then the next command (with burst of, for example, 16) may only be issued after a delay of 4 (pBL=8/2) cycles.

It is noted that different protocols support different burst lengths (e.g., DDR5 may only support BL8, BL16). Given the maximum latency of a DDR protocol is provided to be MAX_LATENCY, and minimum burst length supported by the protocol is MIN_BL, then the maximum commands that may be enqueued (without having matured) may comprise: Ceiling [MAX_LATENCY/(MIN_BL/2)]. For example, if the max latency is 100 and a protocol supports BL2, then essentially there is a maximum of (100/(2/2))=100 commands that may be enqueued. If however, the protocol supports only BL4 and BL8, then the maximum commands that may be enqueued are (100/(4/2))=50. It is further noted that for ease of use, a user is not necessarily required to provide a maximum latency.

Minimum and maximum burst length (MIN_BL, MAX_BL) may also be used to decide the size of bl_tick and start_addr_offset fields. Again, for ease of use, the user need not be required to provide MIN/MAX BL.

The user may recreate addresses based on $fm_cmd( ) return data and the specific protocol in use. For example, $fm_cmd( ) may return the same base_addr and start_addr_offset for the complete burst length duration.

For ease of use, the memory variable (mem0) to the $fm_initiate and $fm_cmd system tasks may be hierarchical.

For ease of debug, an ID (token) field may be assigned to one, some or every valid read/write $fm_initiate call. The same ID (token) may later be available when the corresponding command matures. The ID may be part of the fm_cmd_data_t data returned by $fm_cmd. For example, IDs may be repeated in a circular fashion from 0 to 31. This is to ensure minimum hardware cost and at the same time a long enough ID window so that the user may compare the enqueued cmd ID and the corresponding dequeued cmd ID.

Further, a command enum (eUTIL) may be provided. This command may serve multiple purposes for the end-user, including any one, any combination, or all of the following purposes. First, a command may always be stored by the infrastructure during $fm_initiate( ) call (eNOP are never stored in the command Queue) and always dequeued later during $fm_cmd( ) call.

Second, the command enum (eUTIL) does no access the memory (eREAD/eWRITE when matured are guaranteed to access the memory) and is required for other general access and bookkeeping purposes by the protocol user. As one example, for Mode Register Commands, most protocols support Mode register command where after the command matures, a local register array is accessed and the memory is not accessed. As another example, for Parity Error Handling, some memory command requests from CPU/GPU may become corrupted during transmission resulting in parity mismatch when they arrive at the protocol interface. However, the user may still wish to enqueue such commands having parity error. At the time of dequeue, these commands may be ignored and no memory access is performed for them.

Third, by creating a separate type (eUTIL) for these multi-purpose non-memory access commands, infrastructure is also informed and it may choose not to fetch memory contents for these commands. Fourth, the eUTIL command may have latencies completely different from the memory read/write operation (e.g., a register read/write operation may have an associated latency of only 1 clock cycle).

However, eUTIL commands may never be out-of-order with respect to other eREAD/eWRITE operations. Further, the underlying implementation may be able to handle such low latencies for eUTIL commands.

As shown in the figure, a 16-bit field (udata) is included in the fm_cmd_data_t structure. Regardless of the command type (eREAD/eWRITE/eUTIL), client data bits may be stored with every command and thereafter retrieved when the command matures.

Further, system function ($fm_peek) enables the user to have a sneak preview of a future command, such as the next command, in the command queue, as discussed above. The structure of the command may be as follows:

fm_cmd_data_t_fm_rw_next;
        assign fm_rw_next=$fm_peek(mem0, t); //Next command status observer The output of $fm_peek may comprise eNOP/eREAD/eWRITE/eUTIL. In addition, the output of $fm_peek may be determined from the analysis that when the current command ($fm_cmd( )) matures completely (including its Burst Length (BL)), the output that the command that $fm_cmd( ) would generate in the next immediate user cycle. In one or some embodiments, for $fm_peek modeling, the command in the queue is output, such as next command in the queue 2-3 cycles before that command is output via $fm_cmd.

Figure 17:
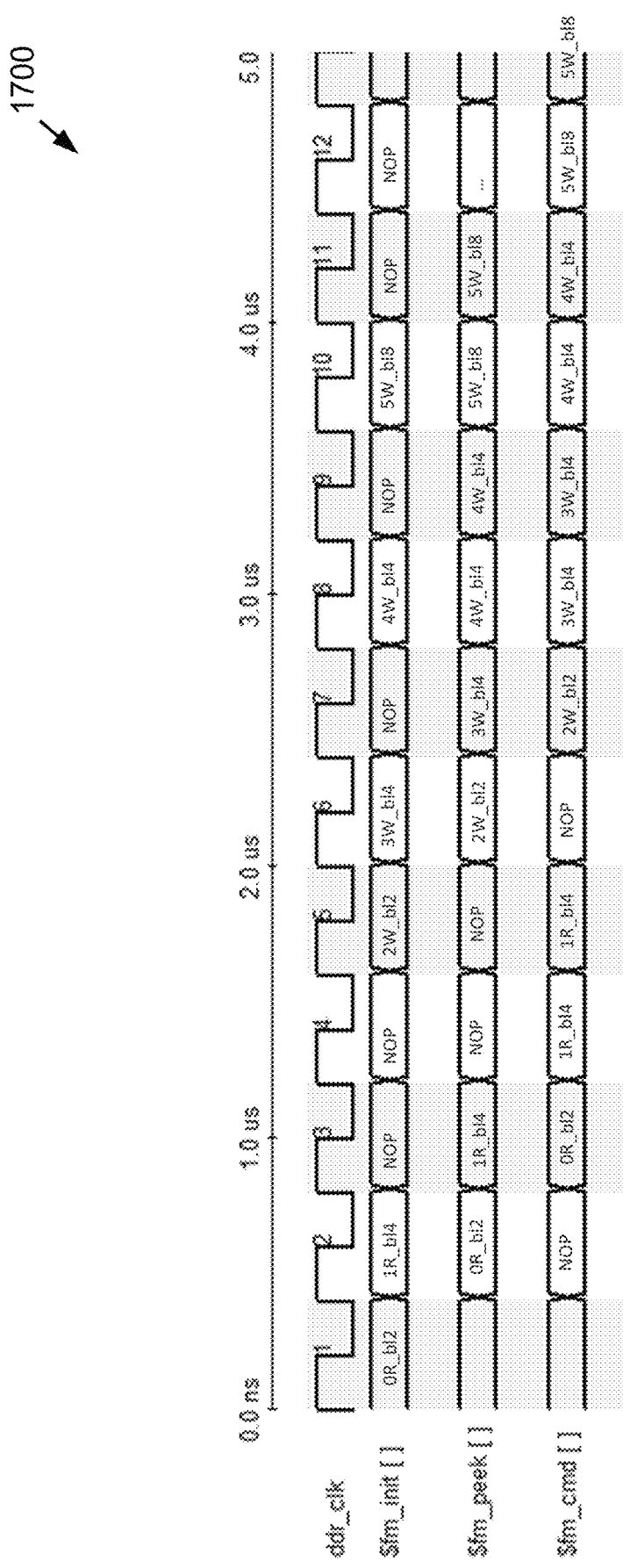
FIG. 17 illustrates the sample output of $fm_peek( ) command on a given simulation time.

Various outputs are contemplated as outputs of $fm_peek. As one example, FIG. 17 illustrates the sample output 1700 of $fm_peek( ) command on a given simulation time. Each cmd in FIG. 17 is shown as: <token_id><R|W>_<burstlength> (e.g., 1R_bl4=>token 1, Rd cmd, bl 4). On each cycle, $fm_peek shows what is the immediate next command that $fm_cmd will generate when the current command completely matures. The user may have pushed NOPs into $fm_initiate queue. However, $fm_peek( ) may show a NOP if it is generated from $fm_cmd. For example, NOPs in $fm_init after token 1 make it to $fm_cmd and hence are part of $fm_peek; however, NOPs after token 3 or token 4 will not make it to $fm_cmd and hence are not part of $fm_peek, as illustrated in FIG. 17.

In particular, a "single" read or write command pushed into $fm_initiate( ) may manifest into a series of 2, 4, 8, 16 or more tick sequences (spanning those many clock cycles) being generated out of the $fm_cmd queue.

Therefore, any NOPs pushed into $fm_initiate immediately after the "single" read/write command and until a factor of the Burst length (e.g., BL/2) of this read/write command will never be pushed out of the $fm_cmd( ). Hence, NOPs in such a situation will likewise not be part of $fm_peek. Rather, only the NOPs that are beyond the burst length of a read/write command will be part of both of the $fm_cmd( ) queue and $fm_peek( ) queue.

The following example embodiments of the invention are also disclosed:

Embodiment 1

A computer-implemented method comprising:
responsive to receiving information regarding at least one aspect of latency, generating, using a memory compiler, a memory model comprising infrastructure regarding the at least one aspect of latency; and
performing, using the memory model, one or both of emulation or prototyping.

Embodiment 2

The method of embodiment 1,
wherein the information is based on one or more system calls indicative of the at least one aspect of latency; and
responsive to accessing the one or more system calls, generating the memory model comprising the infrastructure reflective of the at least one aspect of latency in the one or more system calls.

Embodiment 3

The method of any of embodiments 1 and 2,
further comprising analyzing results of the one or both of emulation or prototyping.

Embodiment 4

The method of any of embodiments 1-3,
wherein the one or more system calls comprise a request system call indicative of a request and a response system call indicative of a response as part of a request-response protocol at a memory interface;
wherein the request call includes the at least one aspect of latency; and
wherein the memory compiler creates the infrastructure indicative of when the request has matured.

Embodiment 5

The method of any of embodiments 1-4,
wherein the at least one aspect of latency is indicative of a time at which the response is expected.

Embodiment 6

The method of any of embodiments 1-5,
wherein the time at which a response is expected is in a number of clock cycles.

Embodiment 7

The method of any of embodiments 1-6,
wherein the memory compiler creates a FIFO infrastructure responsive to the request system call based on the at least one aspect of latency.

Embodiment 8

The method of any of embodiments 1-7,
wherein the FIFO infrastructure delivers the response at a time based on a number of clock cycles indicative of when the request will mature.

Embodiment 9

The method of any of embodiments 1-8,
wherein the request system call includes an access type, an access size, and the number of clock cycles indicative of the time at which the response is expected.

Embodiment 10

The method of any of embodiments 1-9,
wherein the infrastructure comprises a state-machine responsible for tracking dynamic latency associated with a request.

Embodiment 11

The method of any of embodiments 1-10,
wherein a data to satisfy a request is not available in time before an associated latency expires; and
wherein the state-machine causes stalls beginning once the latency expires so that the model execution stalls until the response is available.

Embodiment 12

The method of any of embodiments 1-11,
wherein the data to satisfy a request is produced by a fetch-page request sent to software;
wherein a fetch response associated with the fetch-page request does not arrive back in time before an associated latency expires; and
wherein the state-machine causes stalls so that the model execution stalls until the fetch response is available.

Embodiment 13

The method of any of embodiments 1-12,
wherein the one or more system calls are indicative of one or more structural properties of a memory and a latency between a memory access request and a memory access response.

Embodiment 14

The method of any of embodiments 1-13,
wherein the latency comprises a minimum latency between the memory access request and the memory access response.

Embodiment 15

The method of any of embodiments 1-14,
wherein the infrastructure generated comprises one or more pipeline flops inserted in a memory implementation based on the minimum latency.

Embodiment 16

The method of any of embodiments 1-15,
wherein the one or more pipeline flops in the memory implementation are less than or equal to the minimum latency.

Embodiment 17

The method of any of embodiments 1-15,
wherein the one or more pipeline flops in the memory implementation are greater than the minimum latency.

Embodiment 18

The method of any of embodiments 1-17,
wherein a modeling interface is based on sequential calls at a register-transfer level of modeling.

Embodiment 19

The method of any of embodiments 1-18,
wherein the modeling interface stays invariant to a target implementation of a memory for the memory model, the target implementation comprising: on-board memory; cache-based memory; or a pure software-based memory solution.

Embodiment 20

The method of any of embodiments 1-19,
wherein the one or more system calls comprise a peek system call that looks ahead for responses that are incoming in a future clock cycle.

Embodiment 21

A system comprising:
a processor; and
a non-transitory machine-readable medium comprising instructions that, when executed by the processor, cause a computing system to perform a method according to any of embodiments 1-20.

Embodiment 22

A non-transitory machine-readable medium comprising instructions that, when executed by a processor, cause a computing system to perform a method according to any of embodiments 1-20.

Embodiment 23

A memory compiler comprising:
a processor; and
a non-transitory machine-readable medium comprising instructions that, when executed by the processor, cause a computing system to perform a method according to the following:
accessing information regarding at least one aspect of latency; and
generating a memory model comprising infrastructure regarding the at least one aspect of latency, wherein the memory model is configured for use to perform one or both of emulation or prototyping according to any of embodiments 1-20.

Embodiment 24

The memory compiler of embodiment 23,
wherein the information comprises a request system call indicative of a request and a response system call indicative of a response as part of a request-response protocol at a memory interface; and
wherein generating the memory model comprises generating a FIFO infrastructure responsive to the request system call based on the at least one aspect of latency.

Embodiment 25

The memory compiler of any of embodiments 1 and 2,
wherein the FIFO infrastructure in the generated memory model is configured to deliver a response at a time based on a number of clock cycles indicative of when the request will mature.

Embodiment 26

The memory compiler of any of embodiments 23-25,
  wherein the information comprises a minimum latency between a memory access request and a memory access response; and
  wherein the infrastructure generated comprises one or more pipeline flops inserted in a memory implementation based on the minimum latency.

Embodiment 27

The memory compiler of any of embodiments 23-26,
  wherein the one or more pipeline flops in the memory implementation are less than or equal to the minimum latency.

Embodiment 28

The memory compiler of any of embodiments 23-27,
  wherein the one or more pipeline flops in the memory implementation are greater than the minimum latency.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

The invention claimed is:

1. A computer-implemented method for emulation or prototyping of a circuit design comprising:
  responsive to receiving information regarding circuit design latency of the circuit design, generating, using a memory compiler, a memory model comprising infrastructure regarding the circuit design latency while reducing emulation or prototyping latency when performing the emulation or the prototyping of the circuit design, wherein, responsive to at least one memory access request comprising the information regarding the circuit design latency, creating the infrastructure regarding the circuit design latency based on the information regarding the circuit design latency; and
  performing, using the memory model, one or both of the emulation or the prototyping of the circuit design.

2. The method of claim 1, wherein the information is based on the at least one memory access request indicative of the circuit design latency;
  wherein performing the at least one memory access request results in the emulation or prototyping latency; and
  wherein responsive to accessing the at least one memory access request, generating the memory model comprising the infrastructure reflective of the circuit design latency in the at least one memory access request and reducing the emulation or prototyping latency in performing the at least one memory access request.

3. The method of claim 2, wherein the circuit design latency is used to reduce the emulation or prototyping latency for another request system call; and
  wherein the circuit design latency is indicative of a time at which a response to the at least one memory access request is expected.

4. The method of claim 3, wherein the time at which the response is expected is in a number of clock cycles;
  wherein the memory compiler creates a FIFO infrastructure responsive to the at least one memory access request based on the circuit design latency; and
  wherein the FIFO infrastructure delivers the response at a time based on a number of clock cycles indicative of when the request will mature.

5. The method of claim 3, wherein emulation or prototyping latency is due to fetching data for the another request system call; and
  wherein the fetching of the data for the another request system call is performed at least partly during performing the at least one memory access request.

6. The method of claim 1, wherein the memory model performs at least one action related to the emulation or prototyping latency at least partly during the circuit design latency.

7. The method of claim 6, wherein the at least one action comprises fetching data.

8. The method of claim 1, wherein the information of latency comprises delay due to a cache miss.

9. The method of claim 1, wherein the information of latency in the at least one memory access request comprises on one or more fields in the at least one memory access request; and
  wherein the infrastructure created is based on the one or more fields in the at least one memory access request.

10. The method of claim 9, wherein the one or more fields comprise a type of memory access.

11. The method of claim 10, wherein the type of the at least one memory access comprises one of read, write, burst read, or burst write.

12. The method of claim 9, wherein the one or more fields comprise at least one of:
  a memory core declaration identifier;
  cycle latency in one or more memory accesses; or
  an address range to be accessed.

13. A non-transitory machine-readable medium for emulation or prototyping of a circuit design comprising instructions that, when executed by a processor, cause a computing system to:
  responsive to receiving information regarding circuit design latency of the circuit design, generate, use a memory compiler, a memory model comprising infrastructure regarding the circuit design latency while reducing emulation or prototyping latency when performing the emulation or the prototyping of the circuit design, wherein, responsive to at least one memory access request comprising the information regarding the circuit design latency, creating the infrastructure regarding the circuit design latency based on the information regarding the circuit design latency; and
  perform, using the memory model, one or both of the emulation or the prototyping of the circuit design.

14. The non-transitory machine-readable medium of claim 13, wherein the information is based on the at least one memory access request indicative of the circuit design latency;
  wherein performing the at least one memory access request results in the emulation or prototyping latency; and
  wherein the instructions cause the computing system to, responsive to accessing the at least one memory access request, generate the memory model comprising the infrastructure reflective of the circuit design latency in the at least one memory access request and reducing the emulation or prototyping latency in performing the at least one memory access request.

15. The non-transitory machine-readable medium of claim 14, wherein the circuit design latency is used to reduce the emulation or prototyping latency for another request system call; and
   wherein the circuit design latency is indicative of a time at which a response to the at least one memory access request is expected.

16. The non-transitory machine-readable medium of claim 15, wherein the time at which the response is expected is in a number of clock cycles;
   wherein the memory compiler creates a FIFO infrastructure responsive to the at least one memory access request based on the circuit design latency; and
   wherein the FIFO infrastructure delivers the response at a time based on a number of clock cycles indicative of when the request will mature.

17. The non-transitory machine-readable medium of claim 13, wherein the memory model performs at least one action related to the emulation or prototyping latency at least partly during the circuit design latency.

18. The non-transitory machine-readable medium of claim 17, wherein the at least one action comprises fetching data.

19. The non-transitory machine-readable medium of claim 15, wherein emulation or prototyping latency is due to fetching data for the another request system call; and
   wherein the fetching of the data for the another request system call is performed at least partly during performing the at least one memory access request.

\* \* \* \* \*